United States Patent
Kaneko

(10) Patent No.: US 6,955,494 B2
(45) Date of Patent: Oct. 18, 2005

(54) ADJUSTING MECHANISM FOR INSTALLATION OF PLATE-LIKE MEMBERS

(75) Inventor: Koji Kaneko, Ohmiya (JP)

(73) Assignee: Fujinon Corporation (JP)

( * ) Notice: Subject to any disclaimer, the term of this patent is extended or adjusted under 35 U.S.C. 154(b) by 947 days.

(21) Appl. No.: 09/737,075

(22) Filed: Dec. 13, 2000

(65) Prior Publication Data

US 2002/0051254 A1 May 2, 2002

(30) Foreign Application Priority Data

Dec. 15, 1999 (JP) .......................................... 11-356145

(51) Int. Cl.$^7$ ................................................. G02B 5/08
(52) U.S. Cl. .................................... 403/374.1; 403/329
(58) Field of Search ................................ 403/329, 373, 403/374.1–374.3

(56) References Cited

U.S. PATENT DOCUMENTS

| | | | | |
|---|---|---|---|---|
| 3,879,112 A | * | 4/1975 | Hickey | ........................ 359/874 |
| 4,411,403 A | * | 10/1983 | Tomsu | ........................ 248/575 |
| 5,477,391 A | * | 12/1995 | Boddy | ........................ 359/841 |

FOREIGN PATENT DOCUMENTS

JP    11281876    10/1999

OTHER PUBLICATIONS

U.S. Appl. No. 09/879,012, filed Jun. 12, 2001, entitled Mechanism for Adjustable Installation of Band Plate–Like Member.
U.S. Appl. No. 09/768,883, filed Jan. 24, 2001, entitled Mechanism for Adjustable Installation of Plate–Like Member.

* cited by examiner

Primary Examiner—John R. Cottingham
(74) Attorney, Agent, or Firm—Price, Heneveld, Cooper, DeWitt & Litton

(57) ABSTRACT

A reflector guiding an optical axis is housed in a mirror holder with a compression spring disposed therebetween so that the reflector is biased by the compression spring to move backward. A mirror retainer is rotatably supported by a rear cover for the mirror holder and the reflector is supported by a pair of supporting projections and an adjusting screw to bear against the rear surface of the reflector. The reflector tilts as the projection length of the adjusting screw is changed while the direction in which the effective surface of the reflector faces is changed as the mirror retainer is rotated and thereby the angular position of the adjusting screw is changed.

5 Claims, 16 Drawing Sheets

ADJUSTING MECHANISM FOR INSTALLATION OF PLATE-LIKE MEMBERS

BACKGROUND OF THE INVENTION

1. Field of the Invention

The present invention relates to an adjusting mechanism for installation of a plate-like member such as a reflector used in an optical scanner.

2. Description of the Related Art

The optical scanner used in an image forming apparatus such as a copying machine or printer is generally arranged so that a laser beam emitted from a laser source and containing image information is appropriately focused, then enters deflector means such as a polygon mirror and the laser beam thus deflected irradiates and scans an image carrier as an object to be scanned, for example, a photosensitive drum and forms an electrostatic latent image on this image carrier. This electrostatic latent image is developed with toner to form a toner image, which is then transferred to a transfer medium such as recording paper to form a visible image thereon. As color image forming apparatus, for example, color copying machine or color printer, the image forming apparatus of tandem type has been widely used. In the image forming apparatus of this type, a plurality of image carriers such as photosensitive drums are arranged side by side so that electrostatic latent images may be formed on the respective image carriers as the laser beams containing the image data colored in yellow (Y), magenta (M), cyan (C) and black (BK), respectively, irradiate and scan respective said image carriers. These electrostatic latent images are developed by respective particular kinds of toner to form respective toner images which are then successively transferred to the transfer medium such as recording paper travelling in the direction of the image carriers' side by side arrangement to form color images thereon.

Demand for pluralization of the light beam for scanning and the scanning unit has increased as the high-speed copying machine and the printer have come widely in use. Additionally, in order to ensure the formed image to be distinct, optical characteristics of these plural scanning lights beams as well as the scanning characteristics of these plural scanning units must meet the predetermined requirements and the characteristics of these plural units must be uniform. To ensure the required optical characteristics and the scanning characteristics, installation precision of the optical members constituting the optical scanner must be sufficiently high to achieve the proper operative association one with another. Particularly, even a slight error in the reflecting direction of the reflector or variation in the installed state will deteriorate the optical characteristics as well as the scanning characteristics. To avoid such problems, the reflecting direction of the reflector should be adjusted with high precision.

The adjusting mechanism for installation of the reflector is well known, in which the spacer as thin as possible, for example, a mica plate is disposed between the reflector and the bracket on which the reflector is mounted and thereby said reflector is adjustably tilted. The mirror adjusting mechanism shown by FIG. 28 in the accompanying drawings is well known from Japanese Patent Application Disclosure Gazette No. 1999-281876. This mirror adjusting mechanism of prior art is arranged as follows: The reflector 1 is pivotally supported at its lower end by the mirror supporting member 2 while there is provided the spring member 3 fixed to said mirror supporting member 2 so as to bias the upper end of the reflector 1 from its rear side. The mirror adjusting member 4 kept in contact with the front surface of the reflector 1 at its upper end is moved to adjust the reflector 1 at a desired angle and thereafter said mirror adjusting member 4 is fixed by the set screw 5 to maintain the reflector 1 tilted at this angle.

These conventional adjusting mechanisms as have been described above are inevitably accompanied with the problems as follow. In the case of the mechanism adapted to dispose the spacer between the reflector and the bracket to tilt the reflector, it is certainly possible to adjust a tilt of the reflector omni-directionally. However, the extremely thin spacer makes operation of adjustment troublesome. In addition, a clamping force of the set screw used to fix the reflector is not uniform and consequently it is sometimes impossible to make the reflector face in the desired direction. In other words, no quantitative adjustment is impossible and the adjusting effect largely depends on working accuracy of the components such as the spacer, the reflector and the brackets.

The mirror adjusting mechanism described in said Japanese Patent Application Disclosure Gazette No. 1999-281876 is adapted to adjust a tilt angle of the reflector only in a single direction and not suitable for adjustment of the reflector incorporated into the optical scanner or the like.

SUMMARY OF THE INVENTION

In view of the problems as have been described above, it is a principal object of the present invention to provide an adjusting mechanism for installation of a plate-like member particularly suitable for a reflector in an optical scanner improved so that the direction as well as the tilt angle of said plate-like member can be quantatively adjusted substantially in an omni-directional fashion.

The object set forth above is achieved, according to one aspect of the present invention, by an adjusting mechanism for installation of plate-like member comprising a retaining disc rotatably supported around an axis orthogonal to a plane defining said retaining disc, a plate-like member opposed to said retaining disc and supported on said retaining disc in three point supporting fashion and biasing means adapted to bias said plate-like member toward said retaining disc, wherein at least one of said three supporting points is realized in the form of an adjusting member having a height adapted to be adjustable in the direction of said axis.

The plate-like member is housed within a frame member or the like dimensioned to be appropriately larger than said plate-like member so that said plate-like member may be floatably mounted therein. At the same time, this floatable plate-like member is supported on said retaining disc in three point supporting fashion under the effect of the biasing means disposed between said plate-like member and said frame member. The plate-like member can be stably supported on the retaining disc by adopting the three point supporting fashion.

The three supporting points are located aside from said axis and therefore one of these supporting points can be realized in the form of an adjusting member adapted to be movable in the direction of said axis for adjustment of its height so that the floatable plate-like member may be locally pushed by said adjusting member and tilt toward the side of said biasing means. Obviously, the portion of the plate-like member free from the effect of this adjusting member remains under the effect of said biasing means. In this way, said plate-like member is adjustably tilted.

Rotation of the retaining disc causes the three supporting points and therefore the adjusting member also to rotate around said axis and consequently the position at which the adjusting member bears against the rear surface of the plate-like member is changed. In this way, the direction in which said plate-like member tilts can be changed.

The frame member itself housing the plate-like member may be moved to move the plate-like member and thereby to adjust the relative position of said plate-like member and the other members operatively associated with said plate-like member.

The object set forth above is achieved, according to another aspect of the invention, by an adjusting mechanism for installation of plate-like member comprising a retaining disc rotatably supported around an axis orthogonal to a plane defining said retaining disc, a plate-like member opposed to said retaining disc and supported on said retaining disc in three point supporting fashion, biasing means adapted to bias said plate-like member toward said retaining disc and an adjusting member provided adjacent one of said three supporting points and having a height adapted to be adjustable in the direction of said axis. In this adjusting mechanism, said three supporting points may have a substantially uniform height or one of said three supporting points may have a height different from those of the remaining two supporting points.

As has previously been described, said three point supporting fashion ensures the plate-like member to be stably supported on the retaining disc and said plate-like member can be adjustably tilted by adjusting said adjusting member to extend forward beyond the respective supporting points. The state in which the plate-like member bears against the three supporting points may be defined as the reference state and the tilting angle of the plate-like member may be adjusted by adjusting the height of the adjusting member relative to this reference state. This means that the tilting angle of the plate-like member from the reference state can be quantitatively determined. To support the plate-like member as stably as possible, these three supporting points are preferably provided at the positions defining respective apices of an equilateral triangle. In the case of the supporting points having a uniform height, the state in which the plate-like member is evenly spaced from said frame member housing this plate-like member is defined as the reference state.

The object set forth above is achieved, according to still another aspect of the invention, by an adjusting mechanism for installation of plate-like member comprising a holder adapted to house a plate-like member, biasing means disposed between said plate-like member and said holder and biasing said plate-like member to be spaced from said holder. A plate-like member retainer is rotatably supported around an axis orthogonal to said plate-like member and a rear cover cooperates with said holder to hold said plate-like member, biasing means and plate-like member retainer and rotatably supporting said plate-like member retainer. The plate-like member retainer is formed with a retaining disc on which three supporting points or projections are provided. At least one of said three supporting points or projections is realized in the form of an adjusting member adapted to be movable in the direction of said axis so that its projection height can be adjusted and respective distal ends of said supporting points or projections are kept in contact with said plate-like member.

Said adjusting member is operated to project forward beyond the other supporting points and thereby said plate-like member is forced by the distal end of this adjusting member to get its effective surface tilted at a desired angle.

On the other hand, rotation of said plate-like member retainer changes the position at which the adjusting member bears against the plate-like member and consequently changes the direction in which the effective surface of the plate-like member faces. In this manner, the angle at which the effective surface of the plate-like member tilts as well as the direction in which the effective surface of the plate-like member faces can be easily adjusted by changing the projecting height of the adjusting member and the position at which the adjusting member bears against the plate-like member.

The object set forth above is achieved, according to further another aspect of the invention, by an adjusting mechanism for installation of plate-like member comprising a holder adapted to house a plate-like member, biasing means disposed between said plate-like member and said holder and biasing said plate-like member to be spaced from said holder. A plate-like member retainer is rotatably supported around an axis orthogonal to said plate-like member and a rear cover cooperates with said holder to hold said plate-like member, biasing means and plate-like member retainer and rotatably supports said plate-like member retainer. The plate-like member retainer is formed with a retaining disc on which three supporting points or projections are provided and there is provided adjacent one of said three supporting points or projections an adjusting member adapted to be movable in the direction of said axis so that its projection height can be adjusted. In this adjusting mechanism, said three supporting points may have a substantially uniform height or one of said three supporting points may have a height different from those of the remaining two supporting points.

As has already been described, the plate-like member can be stably supported by said plate-like member retainer using three supporting projections, said plate-like member can be tilted by changing the height of the adjusting member and the direction in which the effective surface of said plate-like member faces by rotating said plate-like member. The state in which the plate-like member bears against these three supporting points can be defined as the reference state and the tilt angle of the plate-like member from this reference state can be quantitatively determined. These three supporting points are preferably provided at the positions defining the respective apices of the imaginary equilateral triangle in order to support the plate-like member as stably as possible. If a tilt angle of the plate-like member is given in a stage of designing, one of the supporting projections may be dimensioned to be different from those of the remaining two supporting projections and the state in which the plate-like member tilts at the angle close to the design value may be defined as the reference state.

According to one preferred embodiment of the invention, said retaining disc is supported movably back and forth along an axis orthogonal to the plane defining said retaining disc. According to one preferred embodiment of the invention, said retaining disc is supported movably back and forth along an axis orthogonal to the plane defining said retaining disc.

Back or forth movement of said retaining disc causes the adjusting member and the supporting points provided on said retaining disc to move back or forth and thereby causes the plate-like member to move back or forth. To move the retaining disc in one direction, said plate-like member may be moved against the biasing force exerted on said plate-like member. To move the retaining disc, said plate-like member may be moved back under the restoring force of said biasing means.

According to another preferred embodiment of the invention, said plate-like member is a reflector incorporated into an optical scanner. Incorporation of this adjusting mechanism into the optical scanner so as to be operatively associated with the reflector enables the reflecting direction of this reflector to be easily and quantitatively adjusted. With an advantageous consequence, the reflector can be adjustably installed at a high precision and the desired optical characteristics as well as the desired scanning characteristics of the optical scanner can be ensured and maintained.

DETAILED DESCRIPTION OF THE EMBODIMENTS

The adjusting mechanism for installation of the plate-like member according to the invention will be more fully understood from the description of the preferred embodiments given hereunder in reference with the accompanying drawings. These embodiments will be described with respect to the case in which the plate-like member takes the form of a reflector in the optical scanner and more particularly with respect to the optical scanner adapted to have the reflector provided with this adjusting mechanism.

Figure 19:
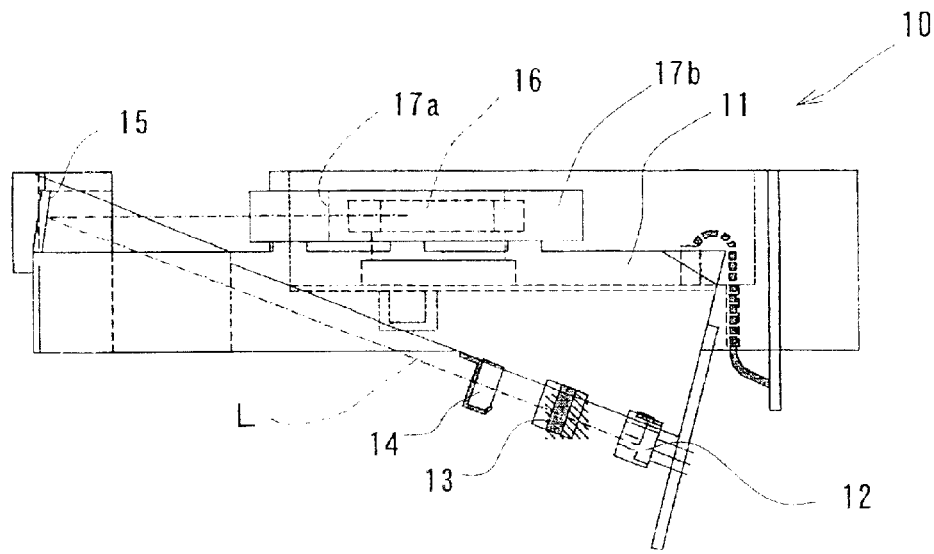
FIG. 19 is a front view of a first example of an optical scanner adapted to have the reflector provided with the adjusting mechanism according to the invention.
Figure 20:
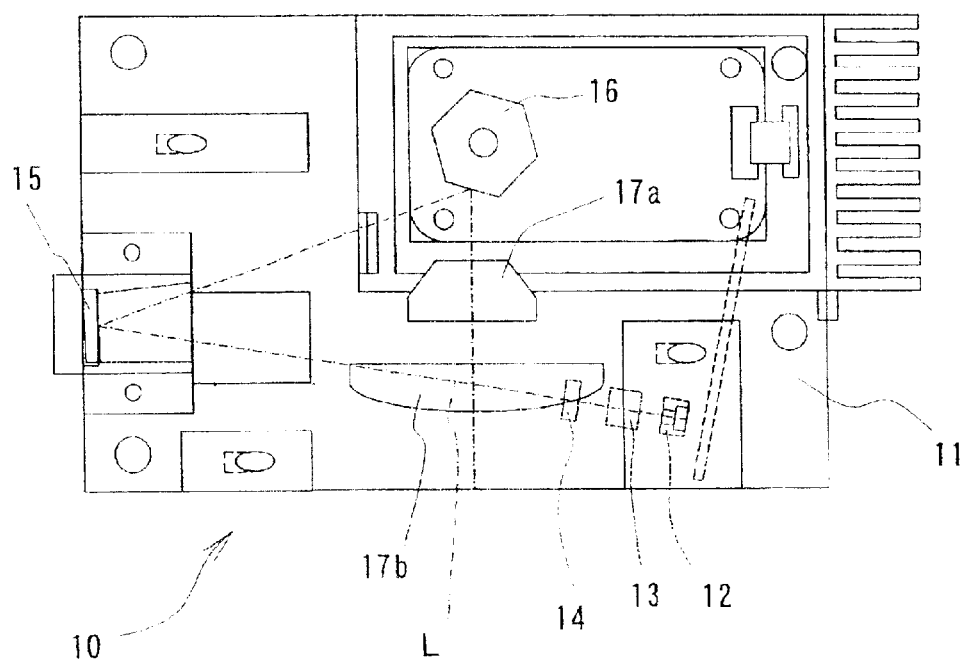
FIG. 20 is a plan view of the optical scanner shown in FIG. 19.

An optical scanner 10 shown in FIGS. 19 and 20 comprises a metallic chassis 11 serving as a base on which necessary optical members are mounted. The chassis 11 is provided on its lower side at one corner with a laser source 12 in the form of a laser diode. A laser beam L emitted from the laser source 12 may obliquely pass through the chassis 11 to the end on its upper side opposite to the end at which said laser source 12 is placed. In front of the laser source 12, the chassis 11 is provided on its lower side with a collimator lens 13 and a cylindrical lens 14 serving for the purposes, for example, of adjusting a diameter of the laser beam L. The optical members such as these laser source 12, collimator lens 13 and cylindrical lens 14 are installed on the lower side of the chassis 11 in conformity with reference markings provided thereon (not shown).

The upper side of said chassis 11 is provided at a position on its end with a reflector 15 so that the laser beam L passing through the cylindrical lens 14 may be incident upon said reflector 15. The upper side of said chassis 11 is further provided with deflector means in the form of a polygon mirror 16 lying substantially at the middle on a diagonal line defined between the corner adjacent to which the laser source 12 lies and the corner obliquely opposite thereto. The polygon mirror 16 is a substantially hexagonal mirror having six side surfaces as reflecting surfaces and rotated at an appropriate velocity. The laser beam L reflected on said reflector 15 is directed along an optical path extending in a plane orthogonal to a rotational axis of said polygon mirror 16 to the reflecting surfaces of said polygon mirror 16. The laser beam L reflected on said reflecting surfaces of said polygon mirror 16 is successively deflected so as to pass through fθ lenses 17a, 17b provided on the upper side of the chassis 11 at positions substantially above said collimator lens 13 and cylindrical lens 14 on the lower side of the chassis 11 to an image carrier (not shown) such as a photosensitive drum. Electrostatic latent images are formed on the image carrier as the laser beam L irradiates and scans said image carrier. It should be understood that the reflector 15, polygon mirror 16, and fθ lenses 17a, 17b are installed on the chassis 11 in conformity with respective reference markings for installation provided on the upper side of the chassis 11.

In this optical scanner 10, the laser beam L emitted from the laser source 12 provided on the rear side of the chassis 11 is regulated as the beam L successively passes through the collimator lens 13 and the cylindrical lens 14 so that the beam L may follow an optical path extending obliquely of the chassis 11. The beam L then enters said reflector 15 provided on the upper side of the chassis 11 at the end of the chassis 11 opposed to the end of the chassis 11 at which the laser source 12 is provided. The laser beam L reflected on this reflector 15 then enters said polygon mirror 16 and deflected as said polygon mirror 16 rotates. The beam L reflected on said polygon mirror 16 under deflection is guided through said fθ lenses 17a, 17b to the image carrier (not shown) for scanning.

Reflector 15 may be position adjusted to ensure that the laser beam L emitted from the laser source 12 and entering said reflector 15 via the collimator lens 13 and the cylindrical lens 14 should follow the optical path defined in the plane orthogonal to the optical axis of the polygon mirror 16. In other words, said reflector 15 is adapted to be operatively associated with the adjusting mechanism of which the details will be described later so that the laser beam L formed by the optical members provided on the lower side of the chassis 11 may enter the polygon mirror 16 along a predetermined optical path.

Figure 21:
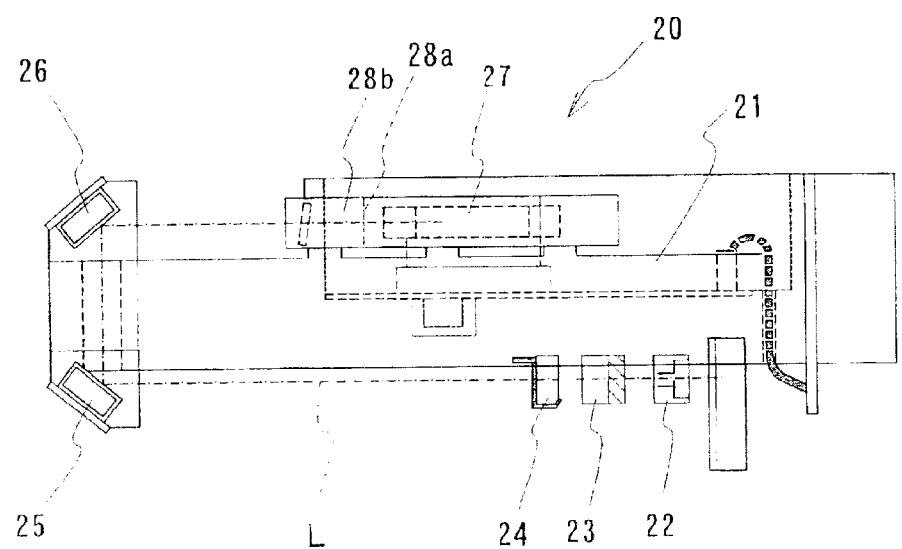
FIG. 21 is a front view of a second example of an optical scanner adapted to have the reflector provided with the adjusting mechanism according to the invention.
Figure 22:
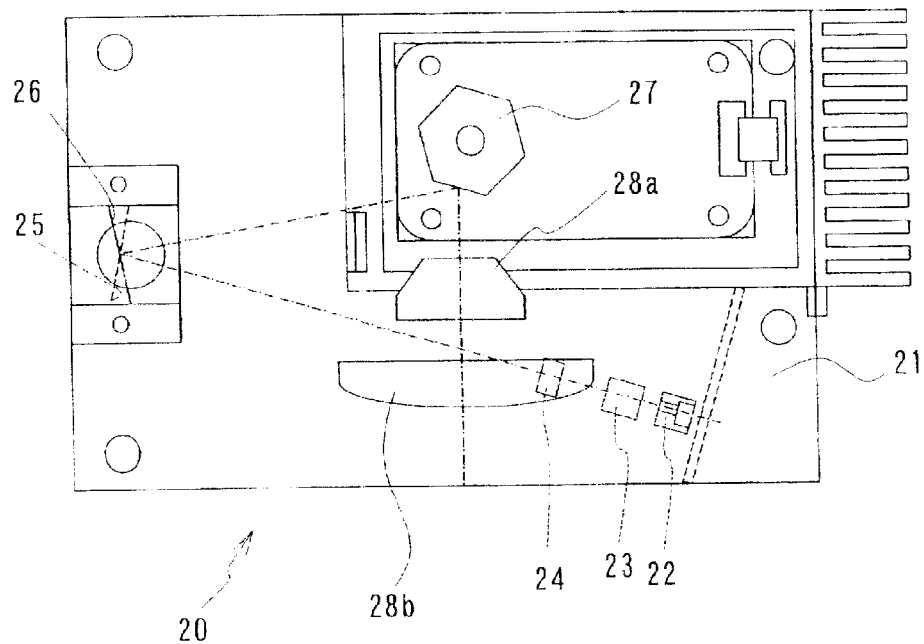
FIG. 22 is a plan view of the optical scanner shown in FIG. 21.

An optical scanner 20 of FIGS. 21 and 22 comprises a metallic chassis 21 serving as a base on upper and lower sides of which necessary optical members are mounted. The chassis 21 is provided on its lower side at one corner with a laser source 22 in front of which a collimator lens 23 and a cylindrical lens 24 are provided in this order. A laser beam L emitted from the laser source 22 is guided along the lower side of the chassis 21 and passes through these collimator lens 23 and cylindrical lens 24 to a first reflector 25 provided on the lower side of the chassis 21 at its end opposite to the end at which the laser source 22 is provided. The optical members such as these laser source 22, collimator lens 23 and cylindrical lens 24 and the first reflector 25 are installed on the lower side of the chassis 21 in conformity with reference makings provided thereon (not shown).

The upper side of said chassis 21 is provided at a position vertically opposed to said first reflector 25 with a second reflector 26 so that the laser beam L reflected on the first reflector 25 may enter this second reflector 26. The laser beam L reflected on the second reflector 26 enters deflecting means in the form of a polygon mirror 27 provided on the upper side of the chassis 21 and the beam L reflected on said polygon mirror 27 is successively deflected so as to pass through fθ lenses 28a, 28b provided on the upper side of the chassis 21 at positions substantially above said collimator lens 23 and cylindrical lens 24 to an image carrier (not shown). Electrostatic latent images are formed on the image carrier as the laser beam L irradiates and scans said image carrier. It should be understood that these second reflector 26, polygon mirror 27, and fθ lenses 28a, 28b are installed on the chassis 11 in conformity with respective reference markings for installation (not shown) provided on the upper side of the chassis 21.

In this optical scanner 20, the laser beam L emitted from the laser source 22 is regulated as the beam L successively passes through the collimator lens 23 and the cylindrical lens 24 so that the beam L may enter said first reflector 25. The laser beam L reflected on this first reflector 25 then enters said second reflector 26 and reflected thereon toward the polygon mirror 27. The laser beam L reflected on said polygon mirror 27 has its direction successively deflected to be guided through said f□ lenses 28a, 28b to the image carrier (not shown) such as a photosensitive drum and scans this. In this way, electrostatic latent image is formed on said image carrier.

To guide the laser beam L emitted from the laser source 22 to the polygon mirror 27, both said first reflector 25 and said second reflector 26 are appropriately adjusted. Specifically, the first reflector 25 is adjusted so that the beam L reflected on said first reflector 25 may enter the second reflector 26 while the beam L reflected on the second reflector 26 may be guided along the optical path defined in the plane orthogonal to the rotational axis of the first reflector 25. In other words, these first and second reflectors 25, 26 are adapted to be operatively associated with the adjusting mechanism as will be described later in details so that the laser beam L formed by the optical members provided on the lower side of the chassis 21 may enter the polygon mirror 27 along the predetermined optical path.

Figure 23:
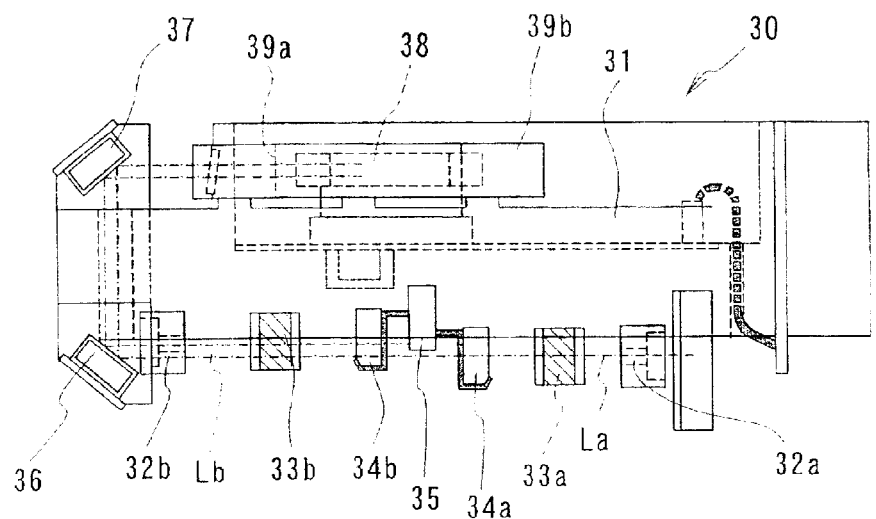
FIG. 23 is a front view of a third example of an optical scanner adapted to have the reflector provided with the adjusting mechanism according to the invention.
Figure 24:
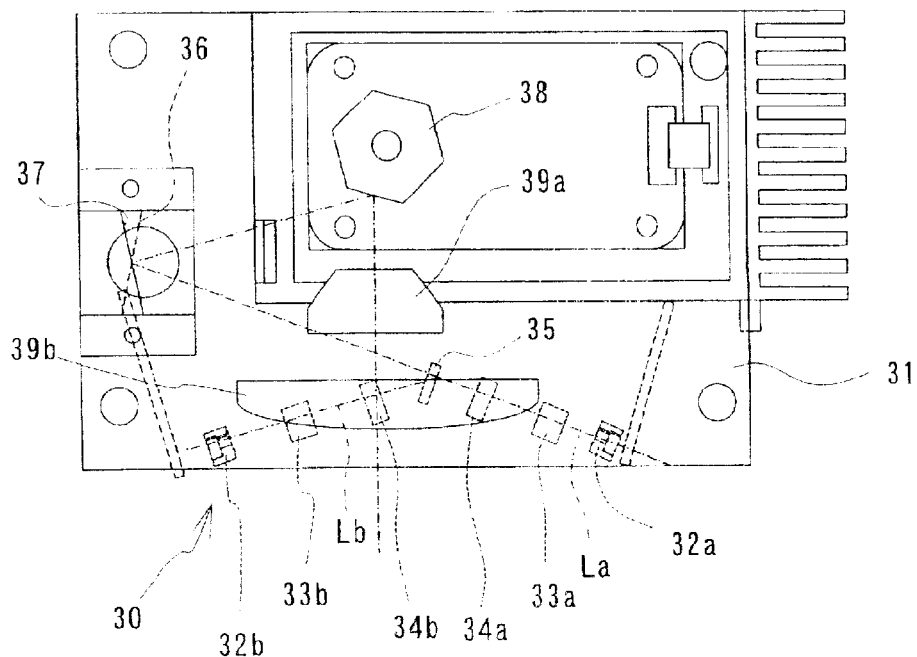
FIG. 24 is a plan view of the optical scanner shown in FIG. 23.

FIGS. 23 and 24 show an optical scanner 30 using a pair of laser beams La, Lb to scan image carriers (not shown) such as photosensitive drums separately provided as objects to be scanned. A metallic chassis 31 serving as a base is provided on its lower side with optical members installed in conformity with reference markings for installation (not shown) provided on the lower side of the chassis 31 to form the respective laser beams La, Lb. The laser beam La is emitted from a laser source 32a provided on the lower side of the chassis 31 at one corner and passes through a collimator lens 33a and a cylindrical lens 34a to a first reflector 36 provided on the lower side of the chassis 31 at the end of the chassis 31 opposed to said laser source 32a. The laser beam Lb is emitted from a laser source 32b provided at the corner opposed to said one corner at which the laser source 32a is provided and passes through a collimator lens 33b and a cylindrical lens 34b to a reflector 35. The laser beam Lb reflected on this reflector 35 is guided in parallel to said laser beam La to said first reflector 36.

The upper side of the chassis 31 is provided with a second reflector 37, a polygon mirror 38 serving as deflecting means and fθ lenses 39a, 39b installed in conformity with reference markings for installation (not shown) provided on the upper side of the chassis 31. The laser beams La, Lb reflected on said first reflector 36 enter the second reflector 37 and reflected thereon toward the polygon mirror 38 along an optical path defined in the plane orthogonal to the rotational axis of said polygon mirror 38. The laser beams La, Lb reflected on the polygon mirror 38 are deflected as said polygon mirror 38 rotates so as to pass through the fθ lenses 39a, 39b to an image carrier as an object to be scanned, for example, a photosensitive drum.

In this optical scanner 30, said first and second reflectors 36, 37 are adjusted so that the laser beams La, Lb may be guided to the polygon mirror 38. Specifically, these first and second reflectors 36, 37 are operatively associated with the adjusting mechanism of which the details will be described later so that the laser beams La, Lb formed by the optical members provided on the lower side of the chassis 31 may enter the polygon mirror 38 provided on the upper side of the chassis 31 along the predetermined optical path. While this optical scanner 30 as the third example has been described above to have said optical path regulated by the pair of reflectors 36, 37, it is possible to regulate said optical path by a single reflector provided on the upper side of the chassis 31 so that the laser beams La, Lb may enter this single reflector obliquely of the chassis 31.

Figure 25:
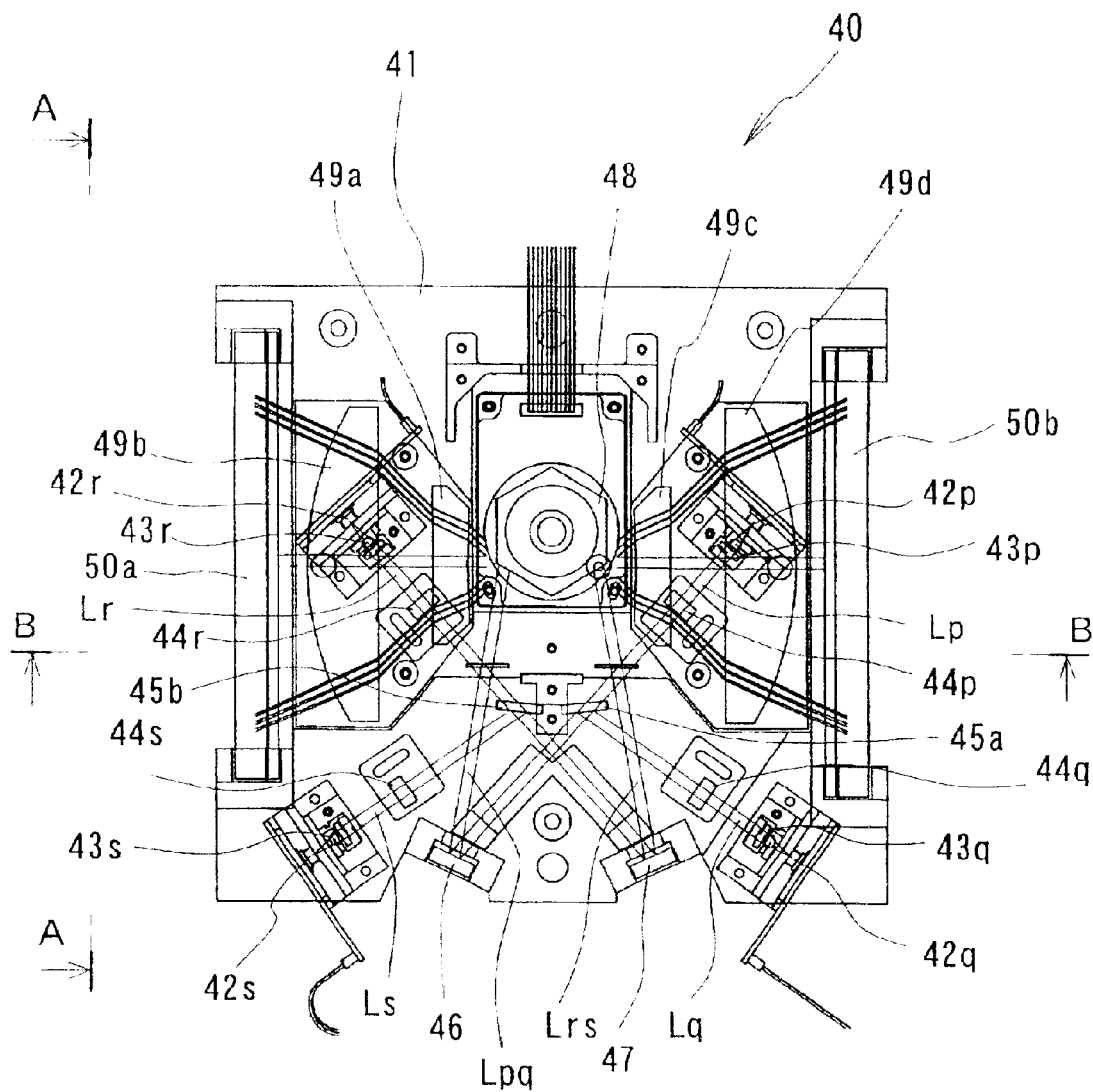
FIG. 25 is a plan view of a fourth example of an optical scanner adapted to have the reflector provided with the adjusting mechanism according to the invention.
Figure 26:
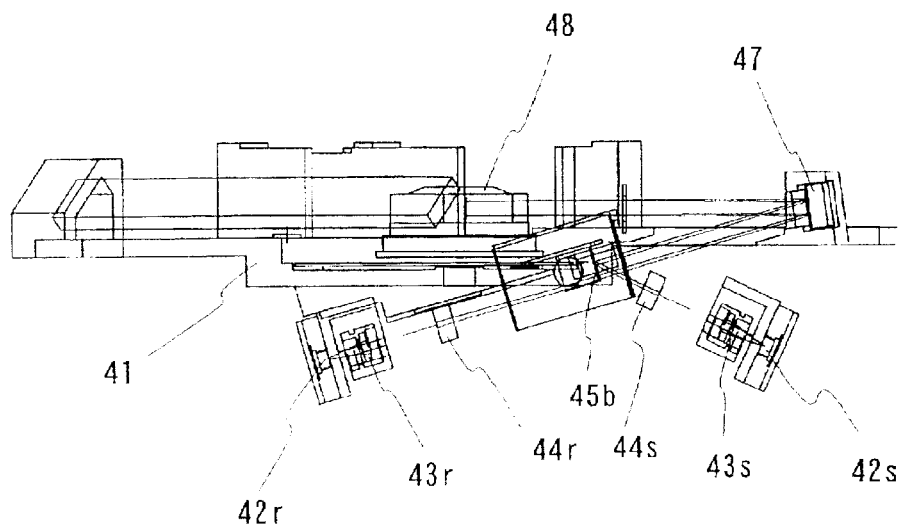
FIG. 26 is a side view of the optical scanner shown in FIG. 25.
Figure 27:
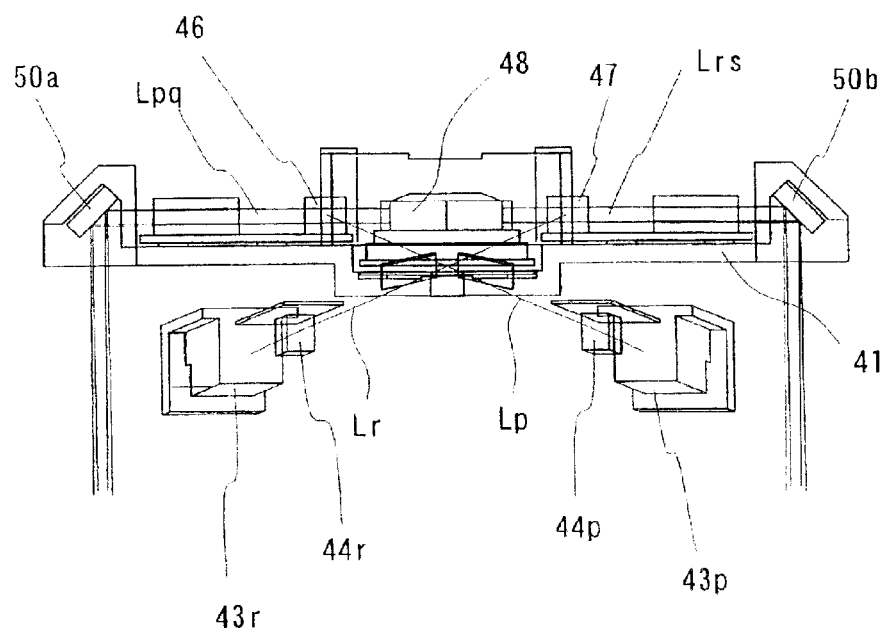
FIG. 27 is a front view of the optical scanner shown in FIG. 25.
Figure 28:
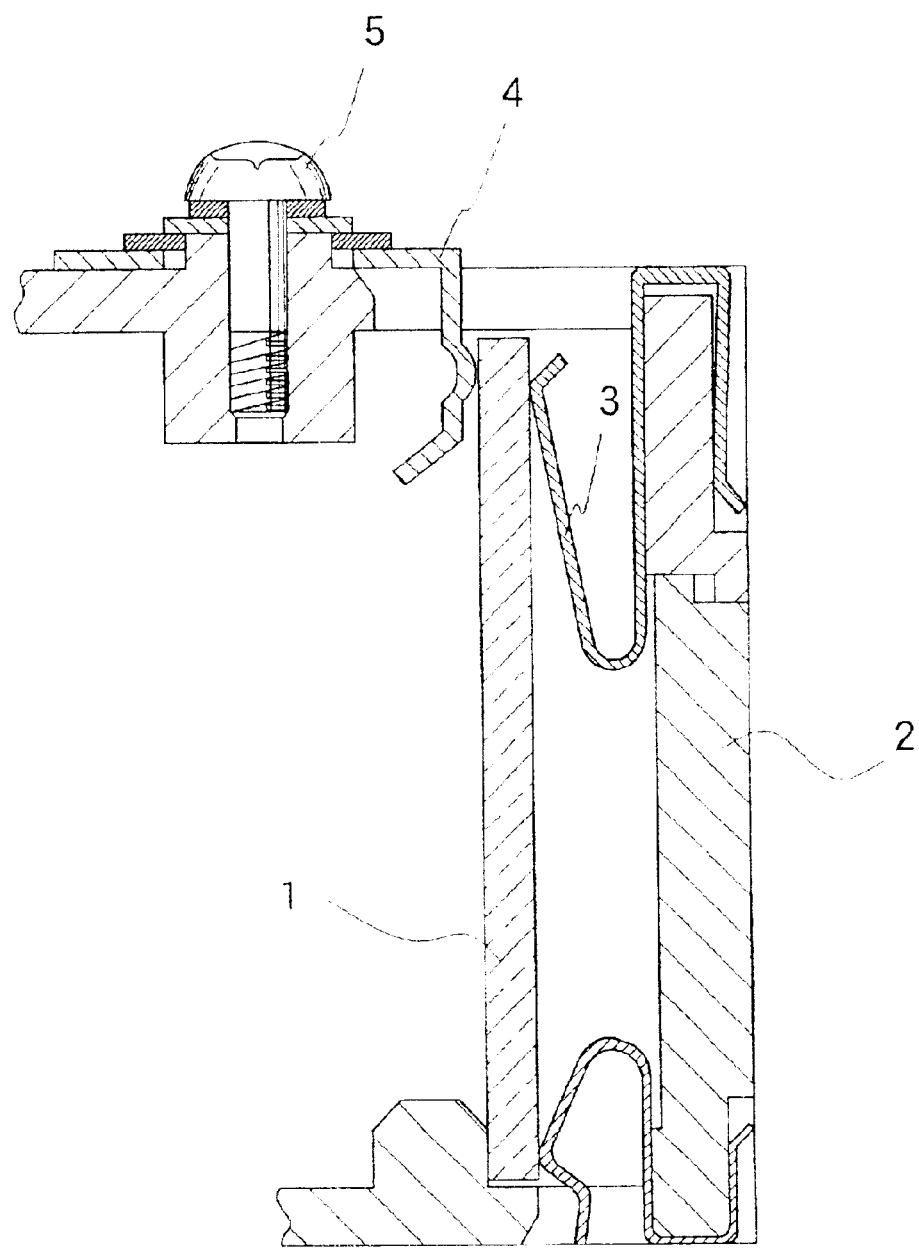
FIG. 28 is a diagram illustrating the adjusting mechanism of prior art for installation of the plate-like member.

An optical scanner 40 shown by FIGS. 25 through 27 is adapted to be incorporated into a color image forming apparatus such as a color copying machine and uses four laser beams Lp, Lq, Lr, Ls corresponding to Y, M, C, BK, respectively, to scan four image carriers (not shown) as objects to be scanned, for example, photosensitive drums. This optical scanner 40 comprises a metallic chassis 41 serving as a base provided on its upper and lower sides with appropriate optical members.

As will be best seen in FIG. 25, the chassis 41 is provided on its lower side along one of transversely opposite sides as viewed in FIG. 25 with laser sources 42p, 42q emitting the laser beams Lp, Lq, respectively. In front of these laser sources 42p, 42q, there are provided collimator lenses 43p, 43q and cylindrical lenses 44p, 44q in this order so that the laser beams emitted from the laser sources 42p, 42q, respectively, may pass through these lenses. The laser beam Lp emitted from the laser source 42p is guided obliquely of the lower side of the chassis 41 to enter a reflector 46 provided on the upper side of the chassis 41 on one of longitudinally opposite ends as viewed in FIG. 25. The laser beam Lq emitted from the laser source 42q passes through the collimator lens 43q and the cylindrical lens 44q to a reflector 45a. The laser beam Lq is reflected on said reflector 45a to be directed in parallel to said laser beam Lp to the reflector 46. The laser beams Lp, Lq (Lpq) reflected on the reflector 46 enter a polygon mirror 48 rotatably supported substantially at the middle on the upper side of the chassis 41 and serving as deflecting means along an optical path defined in the plane orthogonal to the rotational axis of said polygon mirror 48. The beams reflected on this polygon mirror 48 are successively deflected to pass through fθ lenses 49a, 49b to a reflector 50a provided on the upper side of the chassis 41 along its side edge opposed to the side edge along which said laser sources 42p, 42q are provided. As shown, said polygon mirror 48 lies between these opposite side edges.

The chassis 41 is provided on its lower side along its end opposed to the end along which said laser sources 42p, 42q are provided with laser sources 42r, 42s emitting the laser beams Lr, Ls, respectively. Laser beams Lr, Ls pass through collimator lenses 43r, 43s and cylindrical lenses 44r, 44s, respectively. The laser beam Lr enters a reflector 47 provided on the upper side of the chassis 41 while the laser beam Ls is reflected on a reflector 45b so as to be directed in parallel to the laser beam Lr to said reflector 47. The laser beams Lrs reflected on the reflector 47 enter said polygon mirror 48 along an optical path defined in the plane orthogonal to the rotational axis of said polygon mirror 48. Laser beams Lrs and said laser beams Lpq are incident on the polygon mirror 48 at positions symmetric with each other about the rotational axis of said polygon mirror 48. The laser beams Lrs reflected on the polygon mirror 48 have their directions successively deflected to pass through the fθ lenses 49c, 49d to a reflector 50b provided along the side edge of the chassis 41 opposed to said side edge along with said reflector 50a is provided. As will be best seen in FIG. 25, said polygon mirror 48 lies between these opposite side edges.

The respective optical members are installed on the chassis 41 in conformity with reference markings for installation (not shown) provided on the upper and lower sides of the chassis 41. More specifically, said laser sources 42p, 42q, 42r, 42s, said collimator lenses 43p, 43q, 43r, 43s, said cylindrical lenses 44p, 44q, 44r, 44s and said reflectors 45a, 45b are installed on the chassis 41 in conformity with the reference markings provided on the lower side of the chassis 41 while said reflectors 46, 47, said polygon mirror 48, said fθ lenses 49a, 49b, 49c. 49d and said reflectors 50a, 50b are installed on the chassis 41 in conformity with the reference markings provided on the upper side of the chassis 41.

The laser beams Lp, Lq, Lr, Ls emitted from the laser sources 42p, 42q, 42r, 42s are guided to the polygon mirror 48 by adjusting said reflectors 46, 47. Specifically, the reflector 46 is adjusted so that the laser beams Lpq may enter the polygon mirror 48 along the optical path defined in the plane orthogonal to the rotational axis of said polygon mirror 48 and the reflector 47 is adjusted so that the laser beams Lrs may enter the polygon mirror 48 along the optical path defined in the plane orthogonal to the rotational axis of said polygon mirror 48. In this manner, these reflectors 46, 47 are operatively associated with the adjusting mechanism of which the details will be described later so that the laser beams Lp, Lq, Lr, Ls formed by the optical members provided on the lower side of the chassis 41 may enter the polygon mirror 48 along the predetermined optical path.

The laser beams Lpq, Lrs reflected on said reflectors 50a, 50b enter splitter means (not shown), respectively, and splitted by these splitter means into the laser beams Lp, Lq and Lr, Ls. These laser beams splitted in this manner then enter the respective image carriers as the objects to be scanned, for example, the photosensitive drums. Said splitter means may be provided, for example, in the form of two reflectors each having a roof-shaped outer surface as its effective surface operatively associated with each other so that the parallel beams may be incident upon both sides of the respective roofs' apices and thereby splitted into two directions.

Of the laser beams Lp, Lq, Lr, Ls having been emitted from the laser sources 42p, 42q, 42r, 42s, respectively, and having passed through the collimator lenses 43p, 43q, 43r, 43s and the cylindrical lenses 44p, 44q, 44r, 44s, the laser beams Lp, Lr enter the reflectors 46, 47 and the laser beams Lq, Ls are reflected on the reflectors 45a, 45b, respectively, to enter the reflectors 46, 47. The laser beams Lpq, Lrs reflected on the reflectors 46, 47 are successively reflected on the polygon mirror 48 under the deflecting effect and guided through the fθ lenses 49a, 49b, 49c, 49d to enter the reflectors 50a, 50b. The laser beams Lpq, Lrs reflected on said reflectors 50a, 50b are then splitted by the splitter means (not shown) into four laser beams which then enter the image carriers (not shown) and scan them as said polygon mirror 48 rotates. In this way, these four laser beams form electrostatic latent images on the respective image carriers.

Figure 1:
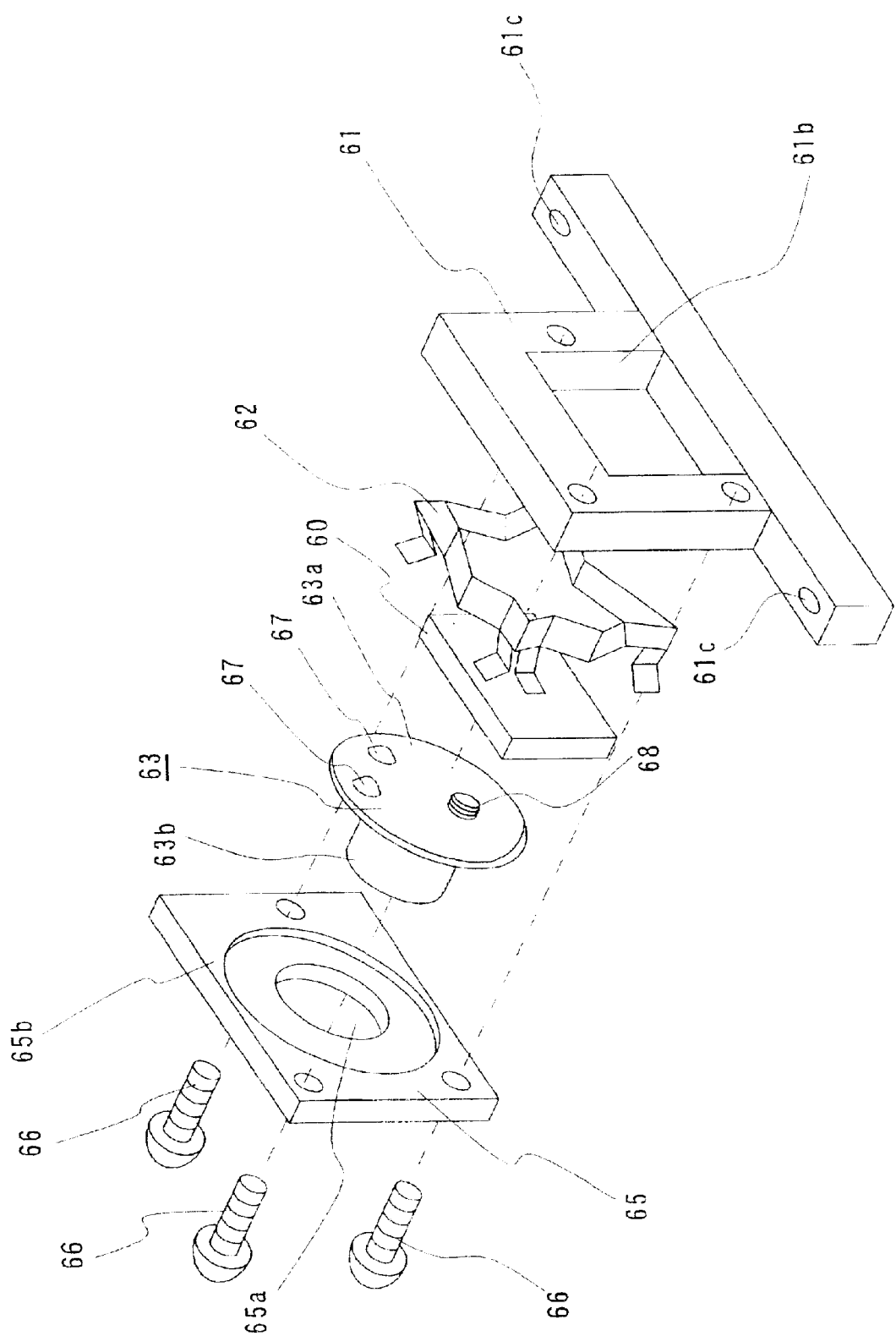
FIG. 1 is an exploded perspective of a first embodiment of the adjusting mechanism according to the invention which is particularly suitable to be incorporated into an optical scanner with a reflector.
Figure 2:
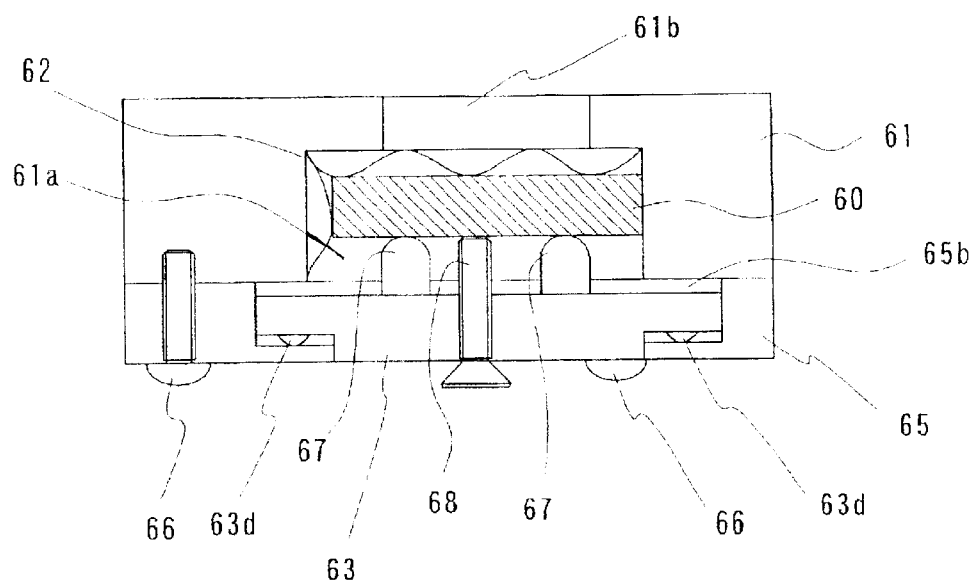
FIG. 2 is a plan view of the first embodiment of the adjusting mechanism shown partially in cross section.
Figure 3:
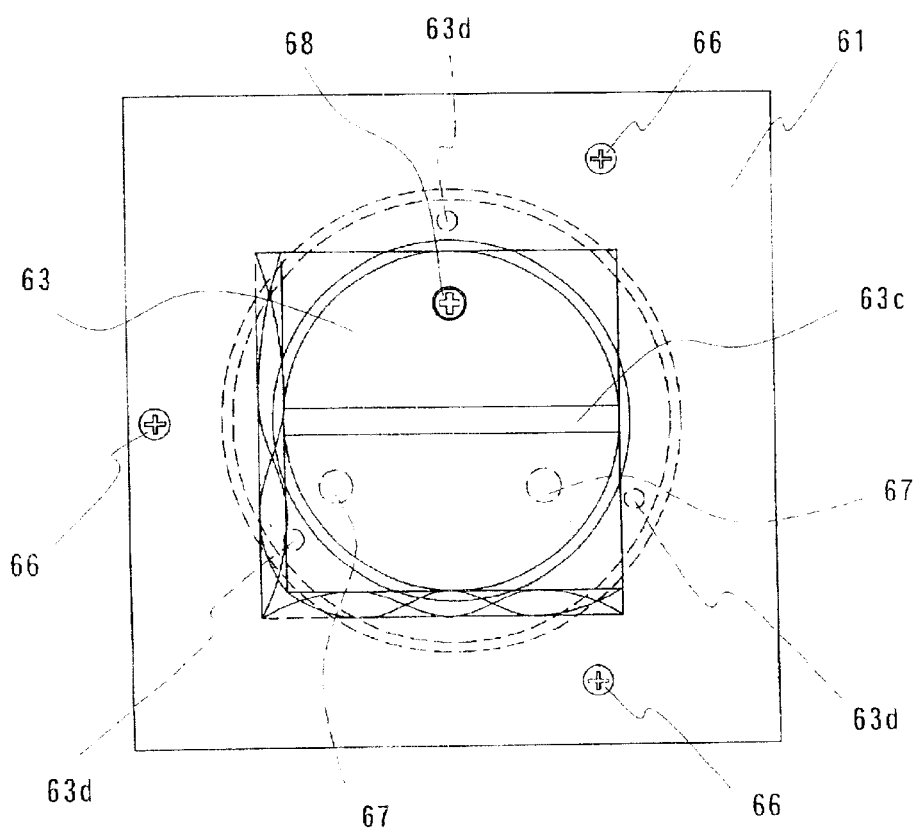
FIG. 3 is a rear elevational view showing the first embodiment of the adjusting mechanism.

FIGS. 1 through 3 show a first embodiment of the adjusting mechanism according to the invention adapted to be operatively associated with said reflectors 15, 25, 26, 36, 37, 46, 47 to adjust the reflecting directions of these reflectors. A reflector 60 corresponding to the plate-like members defining reflectors 15, 25, 26, 36, 37, 46, 47 operatively associated with the adjusting mechanism is floatably received in a housing chamber 61a (FIG. 2) of a mirror holder 61 and movable in appropriate directions. The mirror holder 61 is formed on its front side with an opening 61b within which the reflecting surface of said reflector 60 is exposed. A compression spring 62 in the form of elastic means such as leaf spring or sponge rubber is disposed between the reflector 60 and the mirror holder 61 so that a restoring force of said compression spring 62 biases the reflector 60 to be put aside against a wall surface within the housing chamber of the mirror holder 61 and to be spaced rearward from said mirror holder 61. In other words, said reflector 60 is normally put aside against the inner wall of the housing chamber although said reflector 60 is in the floatable state. Such restoring force of the compression spring 62 is adapted to act on a periphery of the reflector 60 without covering the reflecting surface of said reflector 60.

Behind said reflector 60, a mirror retainer 63 is provided in the form of a plate-like retaining member. This mirror retainer 63 has a disc-like retaining disc 63a as a basic portion and a supporting shaft 63b extending rearwardly of said retaining disc 63a. This supporting shaft 63b is loosely received in a supporting opening 65a formed in a rear cover 65 provided behind said mirror retainer 63. It should be understood that a spot facing 65b is formed around said supporting opening 65a so that said retaining disc 63a may be loosely received by said spot facing 65b. Accordingly, the mirror retainer 63 is rotatable relatively to the rear cover 65. As will be seen in FIGS. 2 and 3, on the rear surface of the retaining disc 63a is formed at positions substantially corresponding to three apices of an equilateral triangle with three projections 63d. These projections 63d rest against a bottom surface of said spot facing 65b to support the mirror retainer 63 so that said mirror retainer 63 may be smoothly rotated relatively to the rear cover 65. Rear cover 65 is secured to said mirror holder 61 by set screws 66.

Retaining disc 63a of the mirror retainer 63 is provided on its side facing the reflector 60 with a pair of supporting projections 67 and an adjusting screw 68 depth-selectively threadably screwed into said retaining disc 63a. The pair of supporting projections 67 and the adjusting screw 68 are arranged at positions corresponding to respective apices of an equilateral triangle. In this manner, the reflector 60 is three-point supported by these supporting projections 67 and adjusting screw 68. The adjusting screw 68 can be advanced or retracted by an appropriate tool from behind said rear cover 65. The supporting projection 63 of the mirror retainer 63 is formed on its end surface with a groove 63c with which an appropriate tool may be engaged in order to rotate said mirror retainer 63 relatively to the rear cover 65.

In this first embodiment of the adjusting mechanism, said compression spring 62 and reflector 60 are housed within the housing chamber 61a of said mirror holder 61, respective distal ends of said supporting projections 67 and adjusting screw 68 engage the rear surface of said reflector 60 to position said mirror retainer 63 and the supporting opening 65b is loosely engaged with the supporting disc 63a of said mirror retainer 66 to cover said mirror retainer 63 with the rear cover 65. The mirror holder 61 is fixed at a predetermined position on the chassis of the scanner by means of set screws or the like extending through tapped holes 61c formed in its legs.

Figure 4:
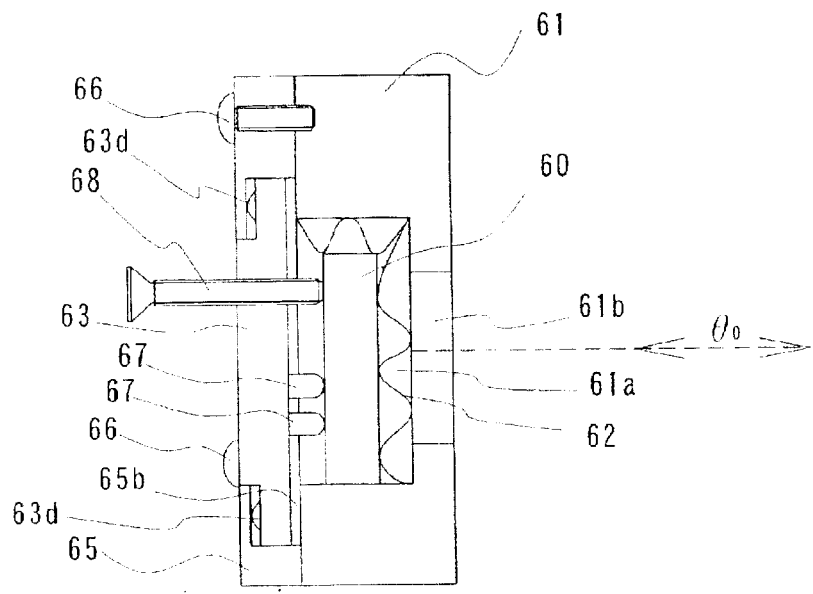
FIG. 4 is a diagram illustrating the first embodiment of the adjusting mechanism with the plate-like member positioned so that its effective surface may face directly on the front thereof.
Figure 5:
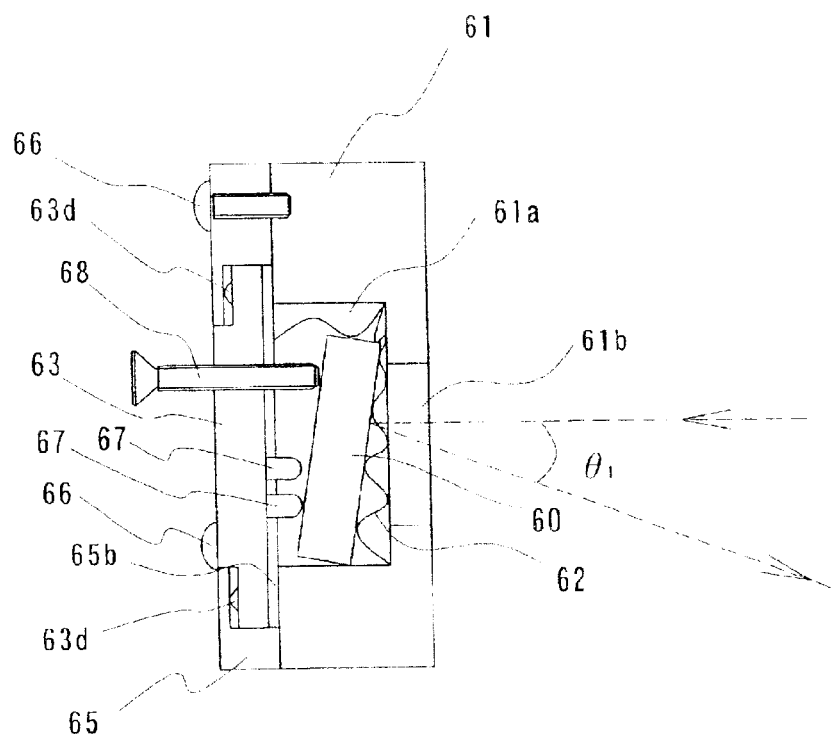
FIG. 5 is a diagram illustrating the first embodiment of the adjusting mechanism with the plate-like member positioned at an angle so that its effective surface may face obliquely downwardly.
Figure 6:
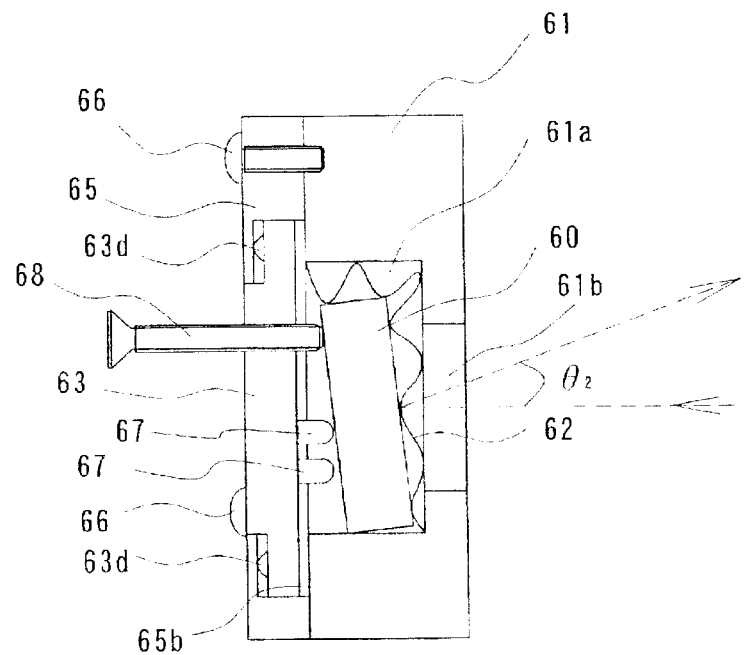
FIG. 6 is a diagram illustrating the first embodiment of the adjusting mechanism with the plate-like member positioned at an angle so that its effective surface may face obliquely upwardly.

A manner in which the reflector 60 is adjustably installed in operative association with the mechanism will be described in reference with FIGS. 4–7. FIGS. 4–6 illustrate how to adjust a tilt angle of the reflector 60. Referring to FIG. 4, the restoring force of said compression spring 62 is evenly exerted upon the reflector 60 so that said reflector 60 is kept substantially in parallel to the retaining disc 63a of the mirror retainer 63. In this state shown by FIG. 4, therefore, the beam perpendicularly incident upon the reflecting surface of the reflector 60 is reflected thereon in the same direction as the incident direction, i.e., at an angle $\theta_0$. As said adjusting screw 68 is screwed forward from its position shown in FIG. 4, the side of the reflector 60 bearing against said adjusting screw 68 is tilted forwardly against the restoring force of the compression spring 62 since said adjusting screw 68 bears against said reflector 60 at a position shifted aside from the center thereof. On the other hand, the side of the reflector 60 destined to bear against said supporting projections 67 now bears against said supporting projections 67 under the restoring force of the compression spring 62. Consequently, the reflector 60 has its reflecting surface tilted as seen in FIG. 5 and its reflection angle of $\theta_1$. While FIG. 5 illustrates one of the supporting projections 67 as if it is spaced from the rear surface of the reflector 60 for better understanding the tilted state of the reflector 60, said reflector 60 really bears against all of the paired supporting projections 67 and the adjusting screw 68 in accordance with said three-point supporting fashion. As the adjusting screw 68 is partially unscrewed from the state shown in FIG. 4 to retract said adjusting screw 68, the reflector 60 is tilted rearwardly under the restoring force of the compression spring 62 until it comes in contact with the supporting projections 67 and the adjusting screw 68 lying rearwardly of said projections 67 as will be seen in FIG. 6. Thus the reflector 60 is tilted at an angle of $\theta_2$ in the direction opposite to the position shown in FIG. 5. In this manner, a tilt of the reflector 60 with respect to the optical path is adjusted. Similarly to FIG. 5, FIG. 6 illustrates one of the supporting projections 67 as if it is spaced from the rear surface of the reflector 60 for better understanding the tilted state of the reflector 60. However, it should be understood that said reflector 60 really bears against all of the paired supporting projections 67 and the adjusting screw 68 in accordance with said three-point supporting fashion.

Figure 7:
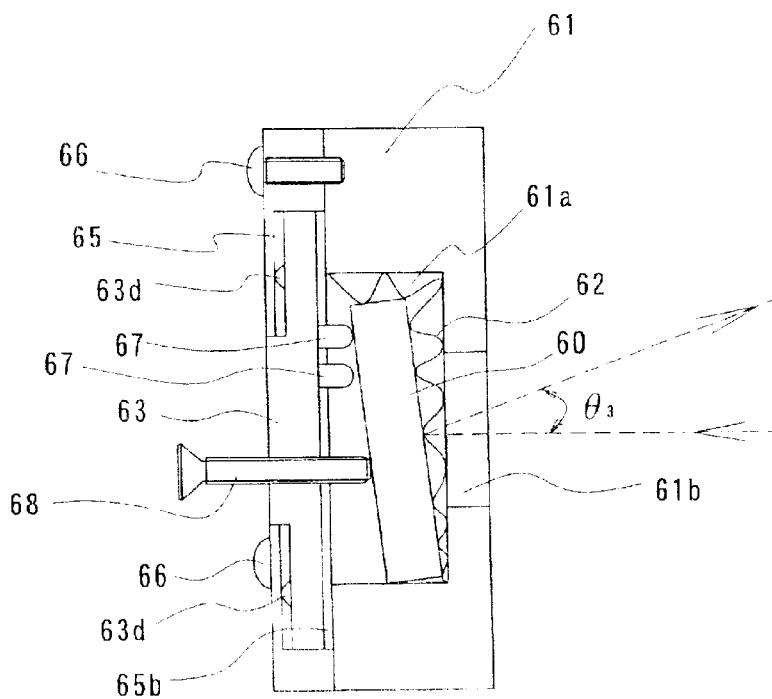
FIG. 7 is a diagram illustrating the first embodiment of the adjusting mechanism with the plate-like member rotated approximately 180° from its position shown in FIG. 5 or FIG. 6.

The direction in which the reflecting surface of the reflector 60 faces is adjustably changed by rotation of the mirror retainer 63 relative to the rear cover 65. Rotation of the mirror retainer 63 causes the position of the adjusting screw 60 relative to the supporting shaft 63b to be rotationally changed. As a result, the position at which the reflector 60 bears against said adjusting screw 68 is adjustably changed. In the course of this adjustment, it is also allowed that the reflector 60 is rotated as the mirror retainer 63 is rotated. For example, rotation of the mirror retainer 63 and therefore of the adjusting screw 68 by approximately 180° from the state of FIG. 5 in which the adjusting screw 68 projects forward beyond the forward ends of the respective supporting projections 67 leads to the reflecting angle is changed from $\theta_1$ to $\theta_3$ as shown in FIG. 7. As will be apparent from comparison of FIGS. 5 and 7, the direction in which the reflecting surface of the reflector 60 is adjustably changed by adjustably rotating the mirror retainer 63 and thereby adjustably changing the angular position of the adjusting screw 68. From the state shown by FIG. 7, a length by which the adjusting screw 68 projects may be adjustably changed to adjustably change the tilt angle of the reflector 60. Similarly to FIG. 5, FIG. 7 illustrates one of the supporting projections 67 as if it is spaced from the rear surface of the reflector 60 for better understanding the tilted state of the reflector 60. However, it should be understood that said reflector 60 really bears against all of the paired supporting projections 67 and the adjusting screw 68 in accordance with said three-point supporting fashion.

In this manner, the adjusting mechanism as has been described above adjusts the reflecting direction of said reflector 15, 25, 26, 36, 37, 46, 47 so that the laser beam L may be incident upon the reflecting surface of said polygon mirror 16, 27, 38, 48 at a predetermined position. The reflecting surface of the reflector 60 can be position-adjusted relative to the direction in which the optical path of the beam is incident upon said reflecting surface by adjusting the installation position of the mirror holder 61.

Figure 8:
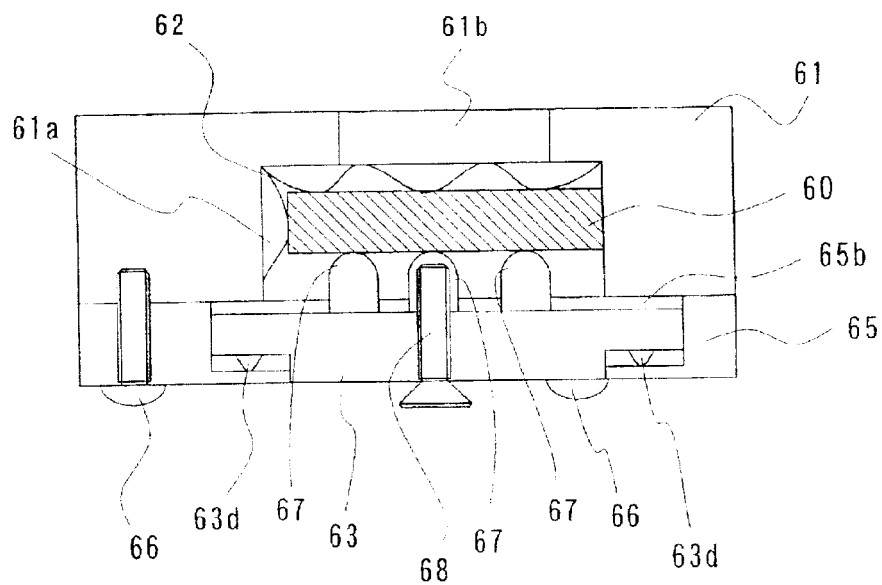
FIG. 8 is a plan view showing a second embodiment of the adjusting mechanism according to the invention shown partially in cross section.
Figure 9:
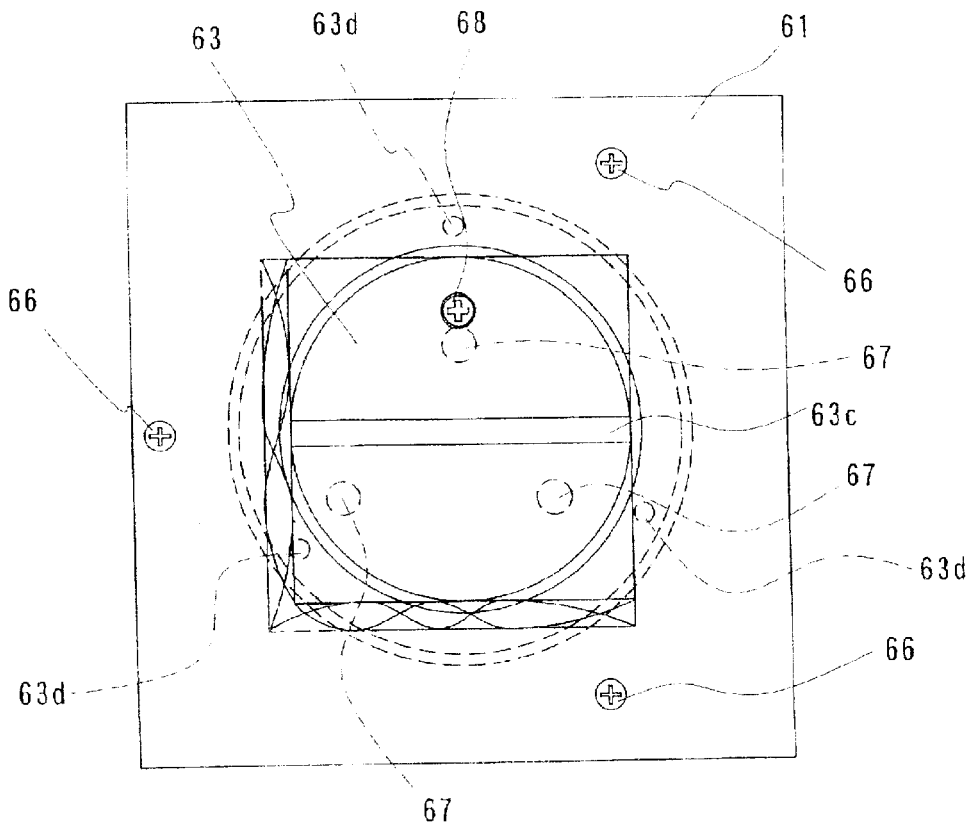
FIG. 9 is a rear elevational view showing the second embodiment of the adjusting mechanism.

FIGS. 8 and 9 show a second embodiment of the adjusting mechanism according to the invention and the parts similar to those in the first embodiment are designated by similar reference numerals. This adjusting mechanism according to the second embodiment has three said supporting projections 67 projecting forwardly over a substantially uniform length and installed at positions substantially corresponding to respective apices of an equilateral triangle. Specifically, one of these three supporting projections 67 is installed at the position corresponding to the position at which the adjusting screw 68 is installed in the adjusting mechanism according to the first embodiment and the adjusting screw 68 is installed adjacent any one of the remaining two supporting projections 67.

Figure 10:
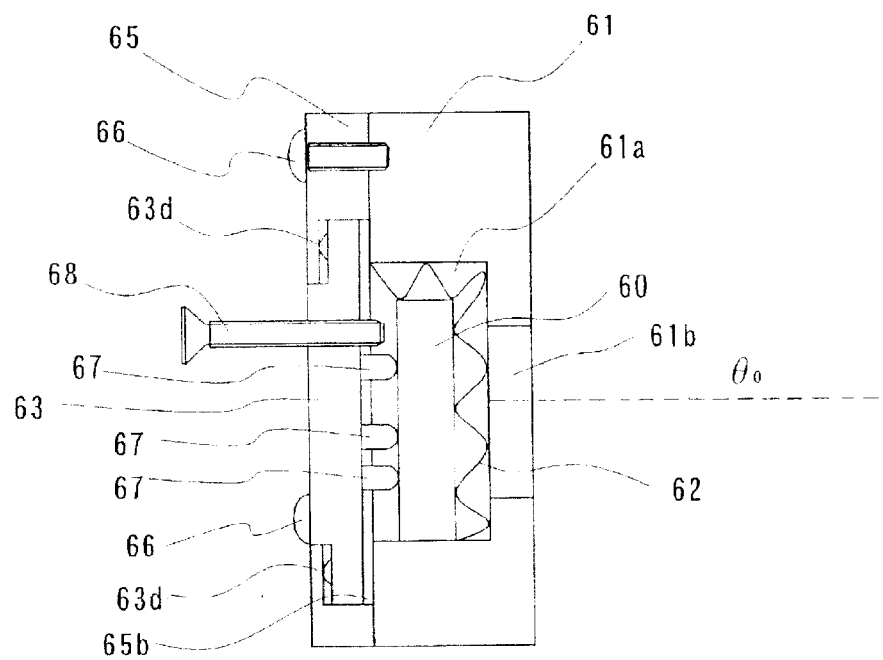
FIG. 10 is a diagram illustrating the second embodiment of the adjusting mechanism with the plate-like member positioned in a reference state so that its effective surface may face directly on the front thereof.
Figure 11:
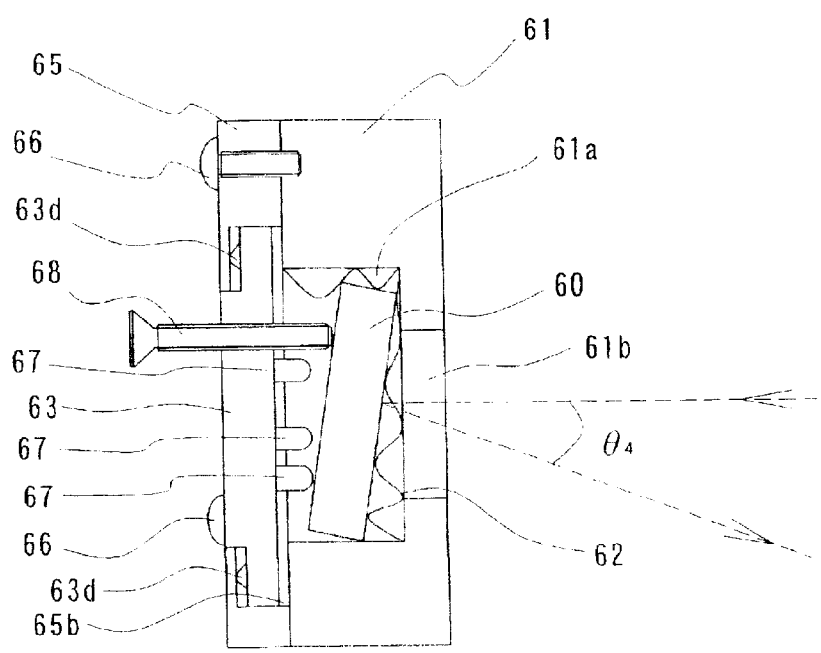
FIG. 11 is a diagram illustrating the second embodiment of the adjusting mechanism with the plate-like member positioned at an angle so that its effective surface may face obliquely downwardly.

In the case of this adjusting mechanism according to the first embodiment, when the adjusting screw 68 lies rearwardly of the supporting projections 67, the reflector 60 bears against the three supporting projections 67 under the restoring force of the compression spring 62 substantially in parallel to the retaining surface 63 of the mirror retainer 63 and defines a reflecting angle $\theta_0$, as seen in FIG. 10. As the adjusting screw 68 is screwed in from this state to project forwardly beyond the distal ends of the respective supporting projections 67, the reflector 60 is locally pushed by said adjusting screw 68 and thereby has its effective surface tilted to define a reflecting angle of $\theta_4$ as seen in FIG. 11. The length over which the adjusting screw 68 projects forwardly may be adjustably changed to adjustably change the tilt angle of the reflector 60. On the other hand, similarly to the case of the first embodiment, the direction in which the effective surface of the reflector 60 faces can be adjustably changed by adjustably rotating the mirror retainer 63 and thereby adjustably changing the angular position of the adjusting screw 68. While FIG. 11 illustrates, similarly to FIG. 5, two of the supporting projections 67 as if they are spaced from the rear surface of the reflector 60 for a better understanding the tilted state of the reflector 60, said reflector 60 really also bears against the pair of supporting projections 67 other than the supporting projection 67 installed adjacent the adjusting screw 68 and this adjusting screw 68.

In the adjusting mechanism according to the second embodiment, the reflector 60 is maintained at a predetermined position by bearing against all the supporting projections 67 so far as the adjusting screw 68 lies rearwardly of these supporting projections 67. The state in which the reflector 60 bears all the supporting projections 67 in this manner can be defined therefore as the reference state. In other words, the tilt angle of the reflector 60 can be quantitatively determined according to the length over which the adjusting screw 68 is advanced with respect to said reference state. Such quantitative adjustment enables operation of adjustment to be easily and reliably carried out. It should be understood that, in the adjusting mechanism according to the second embodiment, the direction adjustment of the optical path may be achieved, for example, by adjustably changing the position at which the mirror holder 61 is installed. It is also possible to provide four or more supporting projections 67.

Figure 12:
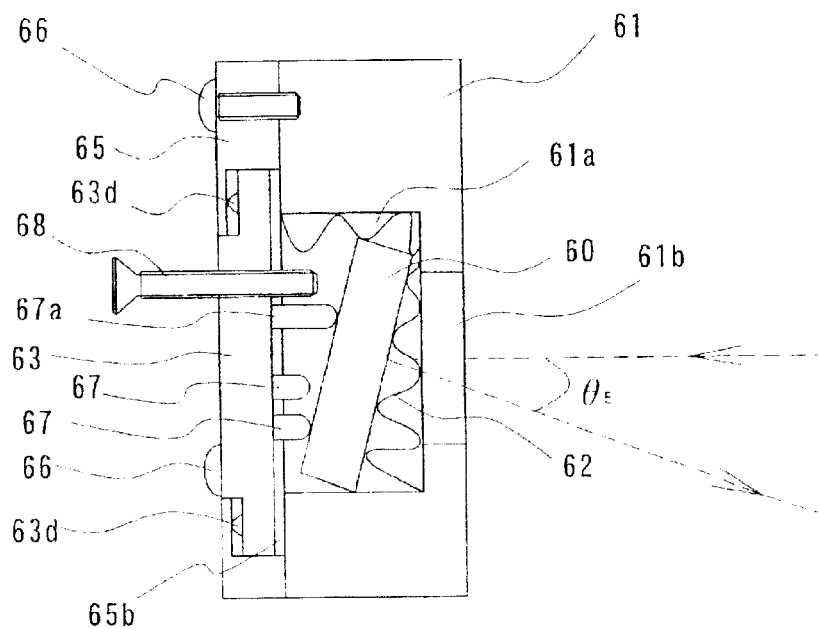
FIG. 12 is a diagram illustrating the adjusting mechanism according to a variant of the second embodiment operates as the plate-like member has been positioned in the reference state so that its effective surface may face obliquely downward.
Figure 13:
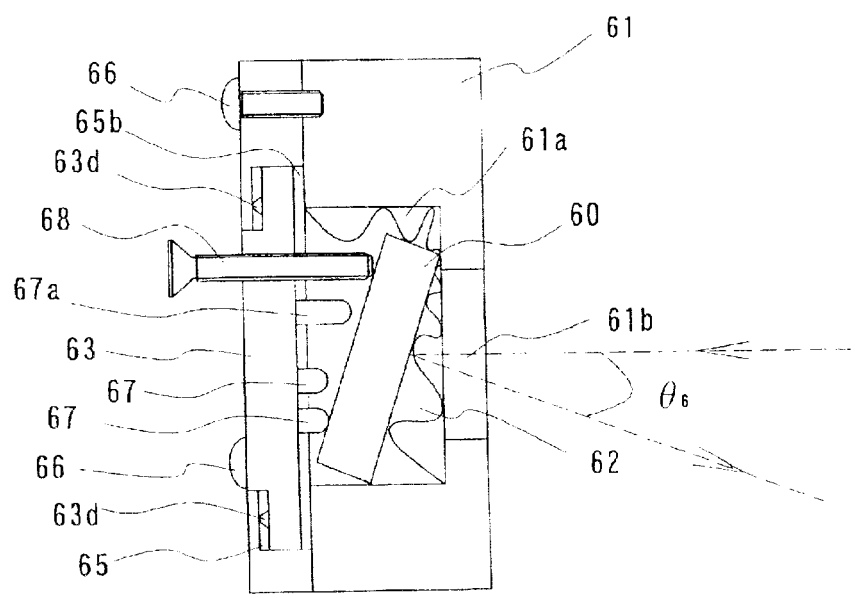
FIG. 13 is a diagram illustrating the adjusting mechanism according to the second embodiment with the plate-like member positioned so that its effective surface may face obliquely further downwardly than in the reference state.

FIGS. 12 and 13 show a variant of the second embodiment in which one of three supporting projections 67, designated here as the supporting projection 67a, is dimensioned to be longer than the remaining two supporting projections 67, and the adjusting screw 68 is provided adjacent said long supporting projection 67a. With this arrangement, the reflector 60 is tilted at an appropriate angle when said reflector 60 bears against these three supporting projections 67, 67, 67a. While FIG. 12 illustrates, similarly to FIG. 5, one of the supporting projections 67 as if it is spaced from the rear surface of the reflector 60. For a better understanding of the tilted state of the reflector 60, reflector 60 really bears against all of the supporting projections 67, 67, 67a.

In general, the effective surface of the reflector incorporated into the optical scanner or the like has its orientation practically given by the design of said optical scanner or the like and therefore the tilt angle of the reflector also is predetermined. In this variant of the second embodiment, the length of said longer supporting projection 67a may be previously dimensioned so as to establish this predetermined tilt angle to obtain the reflecting angle $\theta_5$, as shown in FIG. 12. After the reflector 60 has actually been incorporated into the optical scanner or the like, the adjusting screw 68 may be screwed in forward to adjust the reflecting angle of the reflector 60 to $\theta_6$, as shown in FIG. 13. In this way, optimum adjustment is facilitated. While FIG. 13 illustrates, similarly to FIG. 5, two of the supporting projections 67 as if they are spaced from the rear surface of the reflector 60 for better understanding the tilted state of the reflector 60, said reflector 60 really bears against the pair of supporting projections 67 and the adjusting screw 68.

While said adjusting screw 68 has been described to be provided adjacent the longer supporting projection 67a, it is possible without departing from the scope of the invention to provide said adjusting screw 68 adjacent one of the remaining supporting projections 67.

Figure 14:
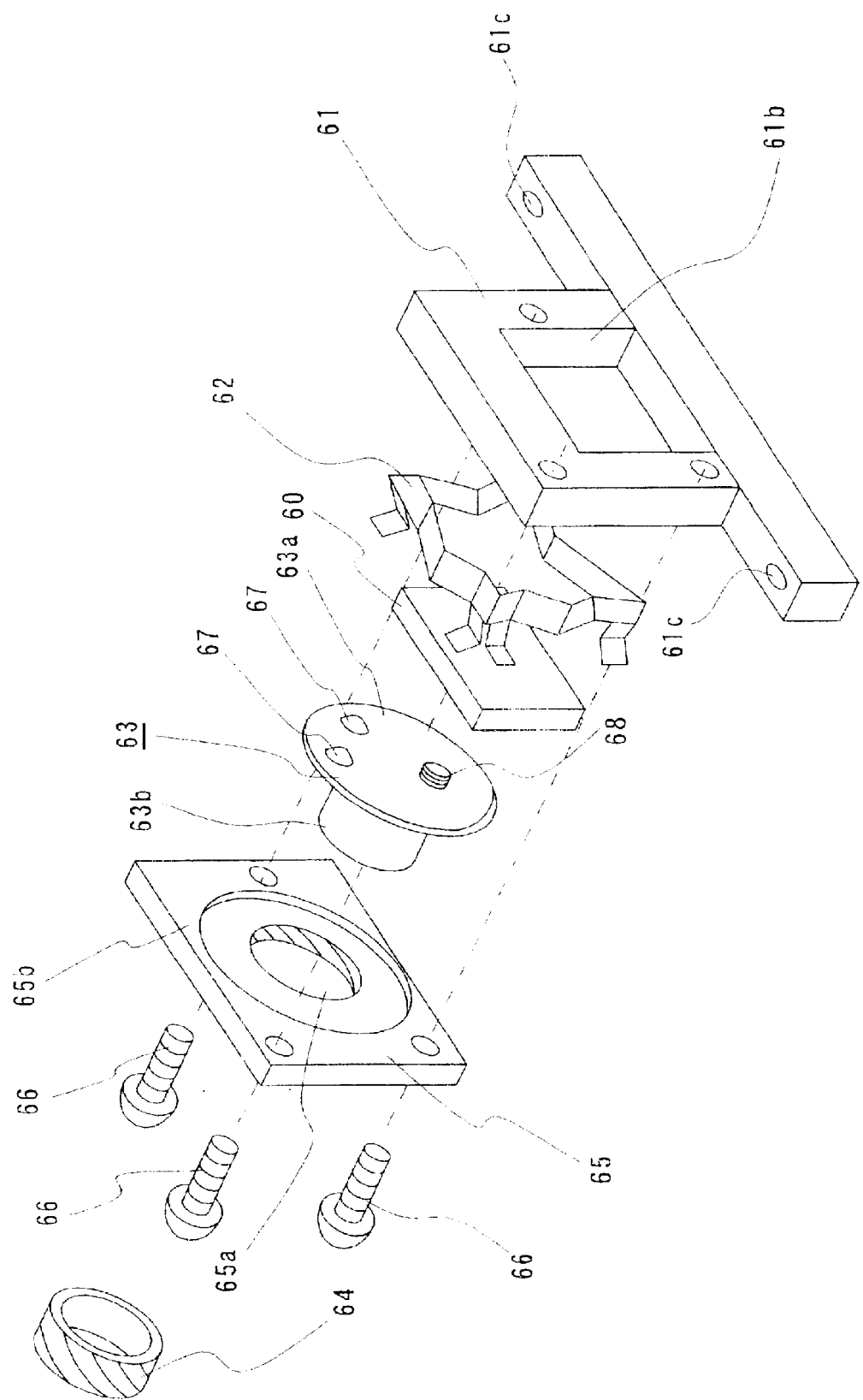
FIG. 14 is an exploded perspective view showing a third embodiment of the adjusting mechanism according to the invention which is particularly suitable to be incorporated into an optical scanner with the reflector.
Figure 15:
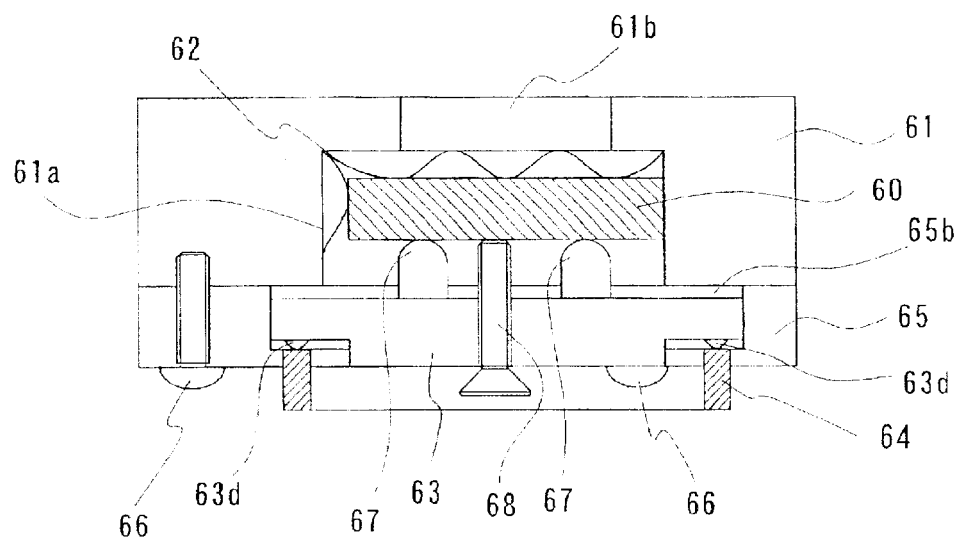
FIG. 15 is a plan view of a third embodiment of the adjusting mechanism shown partially broken away.
Figure 16:
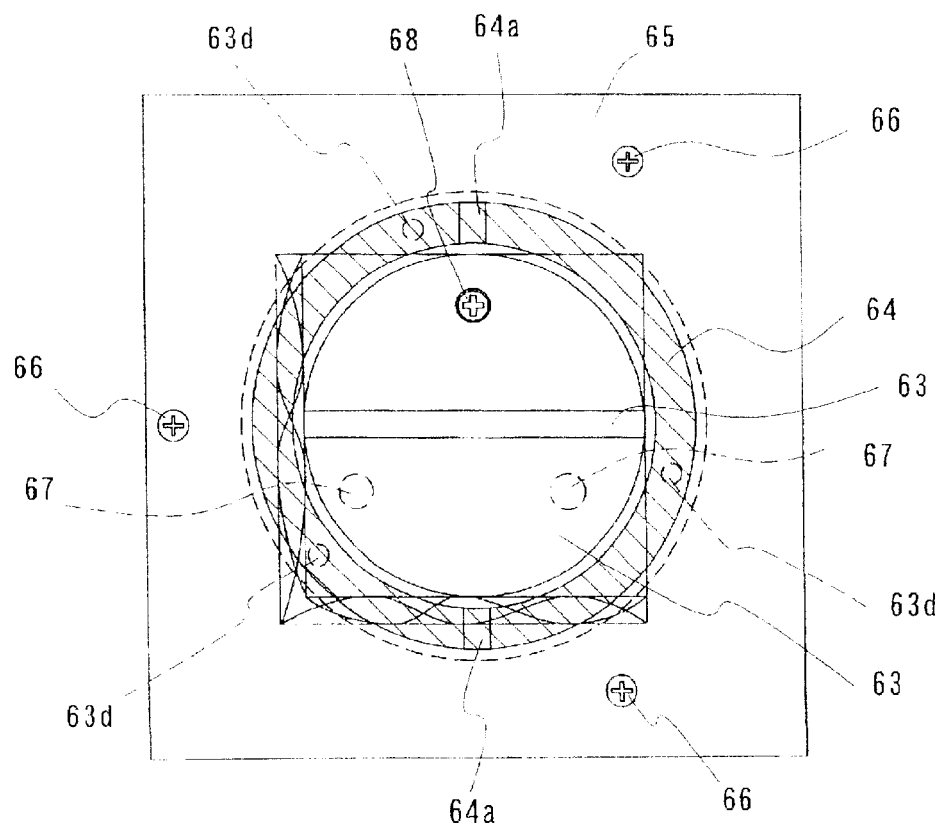
FIG. 16 is a rear elevational view showing the third embodiment of the adjusting mechanism.

FIGS. 14–16 show a third embodiment of the adjusting mechanism for installation of the plate-like member according to the invention and the parts similar to those in the first embodiment are designated by the similar reference numerals. In this adjusting mechanism according to the third embodiment, said rear cover 65 is formed along the inner peripheral surface of its supporting opening 65a with a female thread 65c with which a male thread formed around the outer peripheral surface of a bushing 64 is engaged. The supporting shaft 63b of said mirror retainer 63 is adapted to be loosely received by said bushing 64 which is, in turn, formed on its end surface with appropriate grooves 64a so that said bushing 64 may be easily rotated by an appropriate tool inserted into said grooves 64a.

In this adjusting mechanism according to the first embodiment, said compression spring 62 and reflector 60 are housed within the housing chamber 61a of said mirror holder 61, the respective distal ends of said supporting projections 67 and adjusting screw 68 are put against the rear surface of said reflector 60 to position said mirror retainer 63. Then said mirror retainer 63 is covered with the rear cover 65 into which said bushing 64 has been screwed.

Thereafter said rear cover 65 is secured to the mirror holder 61 by the set screws 66. The mirror holder 61 is fixed at a predetermined position by means of set screws or the like extending through the tapped holes 61c formed in its legs.

In the adjusting mechanism according to the third embodiment, the angle of the reflector 60 can be adjusted by screwing in or out of the adjusting screw 68 and the orientation of the reflector 60 can be adjusted by rotating the mirror retainer 63 relatively to the bushing 64 to change the angular position of the adjusting screw 68 both in the same manner as in the cases of the previously described embodiments.

Figure 17:
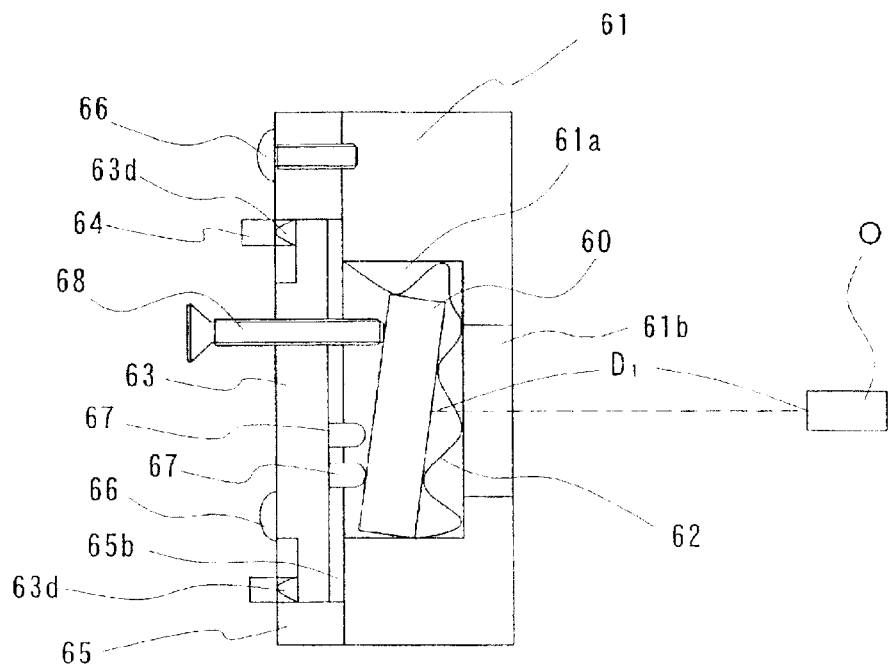
FIG. 17 is a diagram illustrating the third embodiment of the adjusting mechanism with the plate-like member retracted.
Figure 18:
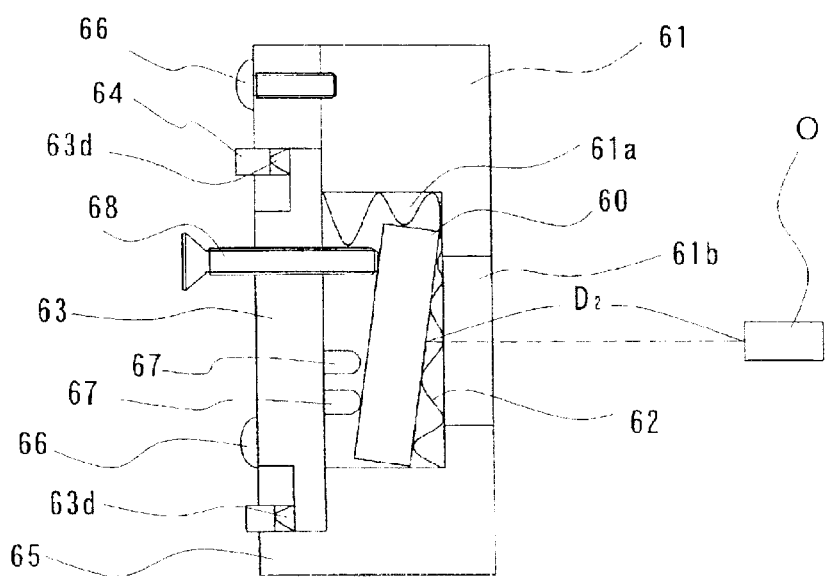
FIG. 18 is a diagram illustrating the third embodiment of the adjusting mechanism with the plate-like member advanced.

The position of the reflector 60 relative to the direction of the optical path can be adjusted by rotating said bushing 64 relatively to the rear cover 65 and thereby moving said bushing 64 back or forth with respect to said rear cover 65. More specifically to describe, a change in the range over which the bushing 64 and the rear cover 65 are engaged with each other causes the bushing 64 to move back or forth. Reflector 60, normally biased by the compression spring 62 to move to a backward position, is forced by said bushing 64 to move forwardly against the restoring force of said compression spring 62 as said bushing 64 is screwed in a forward direction. On the contrary, reflector 60 is moved backward under the restoring force of the compression spring 62 as said bushing 64 is screwed out in a backward direction. Such movement of the reflector 60 enables its position relative to the direction of the optical path to be adjusted. For example, if said bushing 64 is rotated to move forwardly from the position in FIG. 17, it forces the mirror retainer 63 to move forwardly and, in consequence, the reflector 60 bearing against the supporting projections 67 and the adjusting screw 62 now moves forwardly against the restoring force of the compression spring 62 along the optical path, as seen in FIG. 18. If the bushing 64 is rotated in the opposite direction so as to move backwardly, the reflector 60 and the mirror retainer 63 move backward under the restoring force of the compression spring 62 to their positions shown in FIG. 17. As will be apparent from comparison of FIG. 17 and FIG. 18, a distance D from the reflector 60 to an object from which the beam comes to said reflector 60 can be changed from $D_1$ to $D_2$. Similarly to FIG. 5, both FIG. 17 and FIG. 18 illustrate one of the supporting projections 67 as if it is spaced from the rear surface of the reflector 60 for better understanding the tilted state of the reflector 60. However, it should be understood that said reflector 60 really bears against all of the paired supporting projections 67 and the adjusting screw 68 in accordance with said three-point supporting fashion.

In this adjusting mechanism according to the third embodiment also, it is possible to provide three supporting projections 67 as in the second embodiment described with reference to FIGS. 8–11 or to dimension one designated by reference numeral 67a of these three supporting projections 67 to have a projection length larger than those of the remaining two supporting projections 67.

While the specific case has been described in which the adjusting mechanism according to the present invention is incorporated into the optical scanner so that the mechanism may be operatively associated with the plate-like member in the form of the reflector, the plate-like member is not limited to the reflector. For example, the adjusting mechanism according to the invention may be effectively incorporated into the solar cell panel. In this case, the adjusting mechanism enables the panel to follow the sun having its altitude depending on the seasons and thereby to achieve the most efficient generation of electricity. The adjusting mechanism according to the invention may be also used to adjust the orientation of the CCD (charge-coupled device) or the optical sensor relative to the optical path of the incident beam.

As will be apparent from the foregoing description, the novel adjusting mechanism for installation of the plate-like member enables the direction in which the effective surface of the plate-like member faces to be three-dimensionally adjusted. Such adjustment is reliably achieved by operating the adjusting member.

The position of said adjusting member can be easily changed and thereby the operation of adjusting is correspondingly facilitated since the adjusting member is adapted to be rotated by rotating the retaining component.

The novel adjusting mechanism for installation of the plate-like member supports the plate-like member principally in three point supporting fashion. The position of the plate-like member supported on three points in this fashion can be defined as the reference state and thereby the operation of the adjusting can be quantitatively carried out.

Assuming that these three supporting points or supporting projections have a substantially uniform height, said plate-like member will be placed substantially in parallel to the other components such as the retaining component in the reference state in which the plate-like member bears against these three supporting points or supporting projections. Such reference state is preferable for visual recognition.

Assuming that one of these supporting points or supporting projections is dimensioned to be different from the remaining two supporting points or supporting projections so that the plate-like member may tilt at the angle in accordance with the design value, the angle as well as the orientation of the plate-like member can be more rapidly achieved.

The novel adjusting mechanism for installation of the plate-like member adapted to move the retaining component back or forth can move the plate-like member itself back or forth so that the relative position of said plate-like member and the other members can be easily adjusted.

The novel adjusting mechanism for installation of the plate-like member may be operatively associated with the reflector in the optical scanner to adjust the reflecting direction as well as the optical path's direction of the reflector easily and quantitatively. In this way, the optical path, the optical characteristics and the scanning characteristics of said optical scanner can be predetermined.

It will become apparent to those skilled in the art that various modifications to the preferred embodiment of the invention as described herein can be made without departing from the spirit or scope of the invention as defined by the appended claims.

What is claimed is:

1. An adjusting mechanism for installation of a plate-like member comprising:
    a cover;
    a retainer rotatably supported by said cover around an axis orthogonal to a plane of said retainer;
    a plate-like member opposed to said retainer and supported by three spaced-apart projections on said retainer at three spaced-apart points; and
    a biasing member adapted to bias said plate-like member toward said retainer, wherein at least one of said three supporting projections is an adjusting member which is adjustable in the direction of said axis, such that the angle of tilt of said plate-like member can be adjusted by said adjusting member and the direction of tilt of said plate-like member can be varied by rotating said retainer.

2. The adjusting mechanism for installation of a plate-like member according to claim 1, wherein said retaining member is a disc which is rotatably supported for movement in opposite direction along an axis orthogonal to the plane defining said disc.

3. The adjusting mechanism for installation of a plate-like member according to claim 1, wherein said plate-like member is a reflector for incorporating into an optical scanner.

4. The adjusting mechanism for installation of a plate-like member according to claim 2, wherein said plate-like member is a reflector for incorporating into an optical scanner.

5. An adjusting mechanism for installation of a plate-like member comprising:

a cover;
a retainer rotatably supported by said cover around an axis orthogonal to a plane of said retainer;
a plate-like member opposed to said retainer and supported by a plurality of spaced-apart projections on said retainer at a plurality of spaced-apart points; and
a biasing member adapted to bias said plate-like member toward said retainer, wherein at least one of said plurality of supporting projections is an adjusting member which is adjustable in the direction of said axis, such that the angle of tilt of said plate-like member can be adjusted by said adjusting member and the direction of tilt of said plate-like member can be varied by rotating said retainer.

* * * * *

UNITED STATES PATENT AND TRADEMARK OFFICE
CERTIFICATE OF CORRECTION

PATENT NO. : 6,955,494 B2
DATED : October 18, 2005
INVENTOR(S) : Kaneko

It is certified that error appears in the above-identified patent and that said Letters Patent is hereby corrected as shown below:

Column 1,
Line 43, "lights" should be -- light --;
Line 57, after "spacer" insert -- is --;

Column 2,
Line 9, "follow" should be -- follows --;

Column 5,
Line 54, after "embodiment" insert -- that --;
Lines 56-57, "downward" should be -- downwardly --;

Column 7,
Line 33, before "deflected" insert -- is --;

Column 8,
Line 19, before "reflected" insert -- is --;
Line 22, "fΠ" should be -- fθ --;
Line 36, "details" should be -- detail --;
Line 64, before "reflected" insert -- are --;

Column 10,
Line 9, delete "is provided";

UNITED STATES PATENT AND TRADEMARK OFFICE
CERTIFICATE OF CORRECTION

PATENT NO. : 6,955,494 B2
DATED : October 18, 2005
INVENTOR(S) : Kaneko

It is certified that error appears in the above-identified patent and that said Letters Patent is hereby corrected as shown below:

<u>Column 11,</u>
Line 52, "projection 63" should be -- projection 63d --; and

<u>Column 17,</u>
Line 7, "direction" should be -- directions --.

Signed and Sealed this

Twenty-fifth Day of April, 2006

JON W. DUDAS
*Director of the United States Patent and Trademark Office*